(12) United States Patent
Newman et al.

(10) Patent No.: US 6,241,856 B1
(45) Date of Patent: *Jun. 5, 2001

(54) ENHANCED OXIDATION OF AIR CONTAMINANTS ON AN ULTRA-LOW DENSITY UV-ACCESSIBLE AEROGEL PHOTOCATALYST

(75) Inventors: Gerard K. Newman, Oklahoma City; Jeffrey H. Harwell; Lance Lobban, both of Norman, all of OK (US)

(73) Assignee: The Board of Regents of the University of Oklahoma, Norman, OK (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,705

(22) Filed: Nov. 11, 1998

Related U.S. Application Data

(60) Provisional application No. 60/066,041, filed on Nov. 11, 1997.

(51) Int. Cl.[7] .............................. B01D 53/00; A62D 3/00
(52) U.S. Cl. .................................. 204/157.3; 204/158.2; 588/227
(58) Field of Search .............................. 204/157.3, 158.2; 588/227

(56) References Cited

U.S. PATENT DOCUMENTS

| | | | |
|---|---|---|---|
| 4,892,712 | 1/1990 | Robertson et al. | 422/186 |
| 4,966,759 | 10/1990 | Robertson et al. | 422/186 |
| 5,032,241 | 7/1991 | Robertson et al. | 204/157.15 |
| 5,126,111 | 6/1992 | Al-Ekabi et al. | 422/186.3 |
| 5,564,065 | * 10/1996 | Fleck et al. | 422/186.3 |
| 5,866,752 | 2/1999 | Goozner | 588/227 |

OTHER PUBLICATIONS

Dagan et al., "TiO2 Aerogels for Photocatalytic Decontamination of Aquatic Environments", J. of Phys. Chem., vol. 97, No. 49, pp. 12650–12655, Dec. 1993.

M. Astier, et al., Preparation and Catalytic Properties of Supported Metal Or Metal–Oxide On Inorganic Oxide Aerogels, 1918, pp. 315–327 No month available.

S.S. Kistler, Coherent Expanded Aerogels, Copyright Unknown, pp. 52–64 No date available.

T. Boyd, Preparation and Properties of Esters of Polyorthotitanic Acid, 1951, pp. 591–602 No month available.

D.C. Bradley, et al., Structural Aspectes of the Hydrolysis of Titanium Tetraethoxide, 1955, pp. 3977–3988 No month available.

Steven N. Frank, et al., Heterogeneous Photocatalytic Oxidation of Cyanide and Sulfite in Aqueous Solutions at Semiconductor Powders, 1977, pp. 1484–1488 No month available.

(List continued on next page.)

Primary Examiner—Edna Wong
(74) Attorney, Agent, or Firm—Dunlap, Codding & Rogers, P.C.

(57) ABSTRACT

A method of enhancing oxidation of air contaminants on an ultra-low density, UV light accessible aerogel photocatalyst is provided. The method includes the steps of providing a photocatalytic reactor system broadly comprising a photocatalytic reactor cell, a UV light source, and a pump to force the contaminated air stream through the photocatalytic reactor cell. The photocatalytic reactor cell includes glass cell. A catalyst bed formed of a titanium dioxide aerogel is provided in the glass cell whereby a high fraction of the titanium dioxide aerogel is accessible to UV light and gas. The catalyst bed is exposed to UV light from the UV light source and a contaminated air stream is introduced into the photocatalytic reactor cell such that the air stream passes through the catalyst bed causing oxidation of the contaminants of the air stream.

1 Claim, 39 Drawing Sheets

OTHER PUBLICATIONS

Charles Stalder, et al., Photoassisted Oxidation of Water at Beryllium–Doped Polycrystalline $TiO_2$ Electrodes, 1979, pp. 2007–2011 No month available.

Edapolkayil Yesodharan, et al., Photodecomposition of Liquid Water with $TiO_2$–Supported Noble Metal Clusters, 1983, pp. 2145–2153 No month available.

David F. Ollis, et al., Heterogeneous Photoassisted Catalysis: Conversions of Perchloroethylene, Dichloroethane, Chloroacetic Acids, and Chlorobenzenes, 1984, pp. 89–96 No month available.

M. Koudelka, et al., Correlation Between the Surface Composition of $Pt/TiO_2$ Catalysts and Their Adsorption Behaviour in Aqueous Solutions, 1984, pp. 295–305 No month available.

A. Ueno, et al., Silica–Supported ZnS•CdS Mixed Semiconductor Catalysts for Photogeneration of Hydrogen, 1985, pp. 3828–3833 No month available.

Fu–Ren F. Fan, et al., Integrated Chemical Systems: Photocatalysts at $TiO_2$ Incorporated Into Naflon and Clay, 1985, pp. 4418–4420 No month available.

Takashi Ibusuki, et al., Toluene Oxidation on U.V.–Irradiated Titanium Dioxide With and Without $O_2$ $NO_2$ or $H_2O$ at Ambient Temperature, 1986, pp. 1711–1715 No month available.

L.T. Zhuravlev, Concentration of Hydroxyl Groups on the Surface of Amorphous Silicas, 1986, pp. 316–318 No month available.

Ralph W. Matthews, Kinetics of Photocatalytic Oxidation of Organic Solutes Over Titanium Dioxide, 1987, pp. 264–272 No month available.

S. Sakka, et al., Sol–Gel Preparation and Properties of Fibers and Coating Films, 1988, pp. 345–353 No month available.

Jan Augustynski, Aspects of Photo–Electrochemical and Surface Behaviour of Titanium(IV) Oxide, 1988, pp. 1–61 No month available.

Hisao Hidaka, et al., Photodegration of Surfactants Part VI. Complete Photocatalytic Degradation of Anionic, Cationic and Nonionic Surfactants in Aqueous Semiconductor Dispersions, 1989, pp. 279–291 No month available.

Robert L. White, et al, Diffuse Reflectance Infrared Spectroscopic Characterization of Silica Dehydroxylation, 1989, pp. 69–75 No month available.

J. Sabate, et al., A Kinetic Study of the Photocatalytic Degradation of 3–Chlorosalicylic Acid Over $TiO_2$ Membranes Supported on Glass, 1989, pp. 167–177 No month available.

Jesseming Tseng, et al., Mechanistic Aspects of the Photocatalytic Oxidation of Phenol in Aqueous Solutions, 1990, pp. 12–39 No month available.

Roger Palmans, et al., A Molecular Water–Reduction Catalyst: Surface Derivatization of $TiO_2$ Colloids and Suspensions with a Platinum Complex, 1991, pp. 9438–9443 No month available.

M.W. Peterson, et al., Mechanistic Studies of the Photocatalytic Behavior of $TiO_2$. Particles in a Photoelectrochemical Slurry Cell and the Relevance to Photodetoxification Reactions, 1990, pp. 221–225 No month available.

S. Tunesi, et al., Influence of Chemisorption on the Photodecomposition of Salicylic Acid and Related Compounds Using Suspended $TiO_2$ Ceramic Membranes, 1990, pp. 3399–3405 No month available.

Huizhen Chen, et al., Sufactant–Modified Hydrous Titanium Oxide Gels, 1991, pp. 382–397 No month available.

N.B. Jackson, et al., Attachment of $TiO_2$ Powders to Hollow Glass Microbeads: Activity of the $TiO_2$–Coated Beads in the Photoassisted Oxidation of Ethanol to Acetaldehyde, 1991, pp. 3660–3664 No month available.

Huizhen Chen, et al., The Conductivity and the Adsorption Capacity of Surfactant Modified Hydrous Titanium Oxide Gels, 1992, pp. 179–188 No month available.

Jose Peral, et al., Hetergeneous Photocatalytic Oxidation of Gas–Phase Organics For Air Purification: Acetone, 1–Butanol, Butyraldehyde, Formaldehyde, and m–Xylene Oxidation, 1991, pp. 554–565 No month available.

Chung–Ching Yu, et al., Catalysis of the Hydrolysis of Trimethyl Orthobenzoate by Adsorbed Sodium Dodecyl Sulfate, 1992, pp. 2582–2584 No month available.

H.Z. Chen, et al., Aging of Surfactant Modified Titanium Gels, 1993, pp. 298–306 No month available.

Albert P. Philipse, et al., Magnetic Silica Dispersions: Preparation and Stability of Surface–Modified Silica Particles with A Magentic Core, 1993, pp. 92–99 No month available.

Geula Dagan, et al., $TiO_2$ for Photocatalytic Decontamination of Aquatic Environments, Dec. 1993, pp. 12650–12655.

Michael L. Sauer, et al., Acetone Oxidation in A Photocatalytic Monolith Reactor, 1993, pp. 81–91 No month available.

Martine Ulmann, et al., Behavior of Surface Peroxo Species in the Photoreactions at $TiO_2$, 1986, 6523–6530 No month available.

Hussain Al–Ekabi, et al., Kinetic Studies in Hetergeneous Photocatalysts. 1. Photocatalytic Degradation of Chlorinated Phenols in Aerated Aqueous Solutions Over $TiO_2$ Supported on a Glass Matrix, 1987, pp. 526–5731 No month available.

* cited by examiner

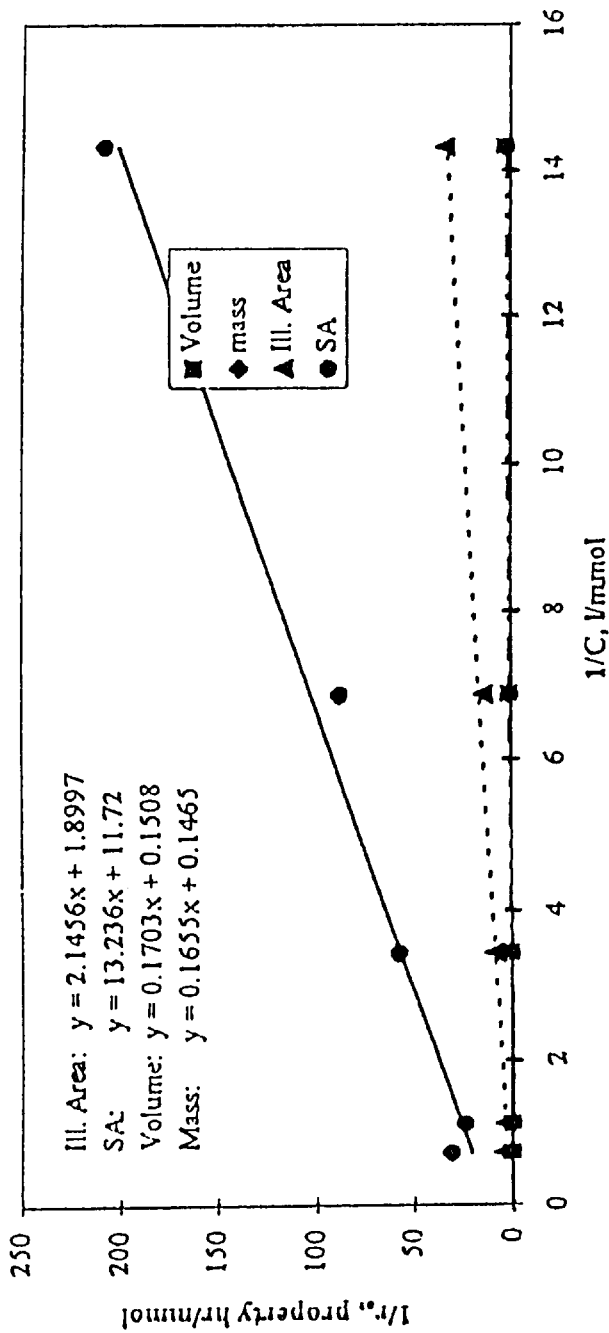

ENHANCED OXIDATION OF AIR CONTAMINANTS ON AN ULTRA-LOW DENSITY UV-ACCESSIBLE AEROGEL PHOTOCATALYST

CROSS-REFERENCE TO RELATED APPLICATIONS

This application claims the benefit of U.S. provisional application Ser. No. 60/066,041, filed Nov. 11, 1997.

STATEMENT REGARDING FEDERALLY SPONSORED RESEARCH OR DEVELOPMENT

Not applicable.

BACKGROUND OF THE INVENTION

1. Field of the Invention

The present invention relates generally to a method of mineralizing air contaminants by oxidation, and more particularly, but not by way of limitation, to an improved method of removing contaminants from an air stream by passing the air stream through an ultra-low density, UV-accessible aerogel photocatalyst.

2. Brief Description of the Related Art

Environmental studies of the deleterious effects of air contaminants are pushing the clean air issue to the forefront of governmental legislation. The direct result of this is that the ability to remove air pollutants quickly, safely, and economically is now a recognized goal of many governmental and industrial organizations. Over the last three decades, in response to this recognized need, the scientific community has examined many different and quite novel remediation technologies as cost efficient candidates for maintaining clean air environments. Of these attempts, it has been the use of solar radiation of photocatalysts that has been seen as one of the most promising candidates for remediation of air contaminants. This perceived viability of photocatalysis for air remediation is due to its ability to catalyze the complete destruction of almost any hydrocarbon-based molecule ranging from common everyday solvents, odors, fragrances, proteins, mildew, viruses, bacteria and other organic vapors. This perspective has resulted in photocatalysis being investigated from many different perspectives: from identifying the most promising catalytic substrate to elucidating its oxidation mechanism. It has been found that titanium oxide and in particular its anatase crystal form is the most robust and catalytically active photocatalyst tested. As a result, efforts to commercialize titanium oxide photocatalytic processes have long been ongoing with some systems already being put in place.

The reality of photocatalysis is that it has stayed at the edge of being widely used by industry despite the fact that the energy driving photocatalysis is freely available solar radiation (or even that of an ultraviolet lamp) as well as the fact that complete destruction of even the most toxic organic compounds can be catalyzed. The primary factor slowing commercialization is seen as the need to increase the effectiveness of the photocatalysts.

Yet, increasingly, environmental concerns are overriding the wait for improvements in photocatalysts and are themselves becoming the driving force behind increasing implementation of photocatalytic processes "as is" in industry. Today, many major hotels are competitively advertising environmentally clean environments such as high quality air, nontoxic carpets, less polluting wall papers and other paraphernalia as well as financing improved air filtration and scrubbing systems. Many air conditioning vendors are experiencing requests for room systems that not only cool the air but also remove the smell of smoke and other odors or solvents. New products are thus being proposed that will attempt to clean the air we breathe and, ultimately, increase the competitiveness of the U.S. air conditioning industry by integrating photocatalytic air cleaners into commercial air conditioning systems. Such a system may be seen as analogous to the catalytic converter on an automobile, yet different in that not heat but light catalyzes the burning of organic pollutants. An added advantage is that photocatalysts also clean indoor air at ambient temperatures, allowing building managers to cut heating, ventilation and air conditioning costs by reducing the rate of air exchange or venting. Despite the advantages of photocatalysts, there are several significant problems which have limited the development of photocatalytic technologies for air decontamination.

First, known photocatalytic materials display a limited surface area to incident light. That is, for photocatalysis to occur, the photocatalytic surface must be accessible to both incident light and to the gases to be reacted. For any catalyst to be efficient, large active surface areas are desirable. Unfortunately, in high surface materials, including titanium oxide, internal pores usually account for nearly all the surface area. While these pores are accessible to gases via gas diffusion, they are not easily irradiated with incident light. It has been found that relevant UV wavelengths penetrate only approximately 4.5 $\mu$m deep in titania. Thus, only pore surface area relatively near the external surface becomes photoactivated which results in low activity.

Second, photocatalysis may be limited by the competition of organic (contaminant) molecules for active surface sites. Particularly with very small pores (typical of high surface area materials), gas diffusion, and adsorption may be highly restricted and become the limiting step in the oxidation process, thus again decreasing the usefulness of the catalyst.

Therefore, a need exist for an improved method of oxidizing a air contaminants with a photocatalyst that is substantially transparent and has an ultra low density which permits most of its high surface area to be jointly accessible to both incident radiation and to the air contaminants. It is to such a method that the present invention is directed.

BRIEF SUMMARY OF THE INVENTION

The present invention is directed to a method for removing contaminants from an air stream by oxidating the contaminants on an ultra-low density, UV light accessible aerogel photocatalyst. The method includes the steps of providing a photocatalytic reactor system broadly comprising a photocatalytic reactor cell, a UV light source, and a pump to force the contaminated air stream through the photocatalytic reactor cell. The photocatalytic reactor cell includes a UV-accessible cell frame. A catalyst bed formed of a titanium dioxide aerogel is provided in the cell such that a high fraction of the titanium dioxide aerogel is accessible to both UV light and gas. The catalyst bed is exposed to UV light from the UV light source and the contaminated air stream is introduced into the photocatalytic reactor cell such that the air stream passes through the catalyst bed causing oxidation of the contaminants of the air stream.

The objects, features and advantages of the present invention will become apparent from the following detailed description when read in conjunction with the accompanying drawings and appended claims.

BRIEF DESCRIPTION OF THE SEVERAL VIEWS OF THE DRAWING

FIG. 4 is a graphical representation showing the IR scan of the gas phase before the UV light was switched on.

FIGS. 14A–14B are graphical representations for determining the methane rate constants for aerogel and anatase and values for rate constants based on mass, volume, illuminated area, and total available, surface area.

FIGS. 16A–16C are graphical representations comparing anatase and aerogel regarding change in acetone gas phase concentration with time at different initial acetone concentrations.

DETAILED DESCRIPTION OF THE INVENTION

Figure 1:
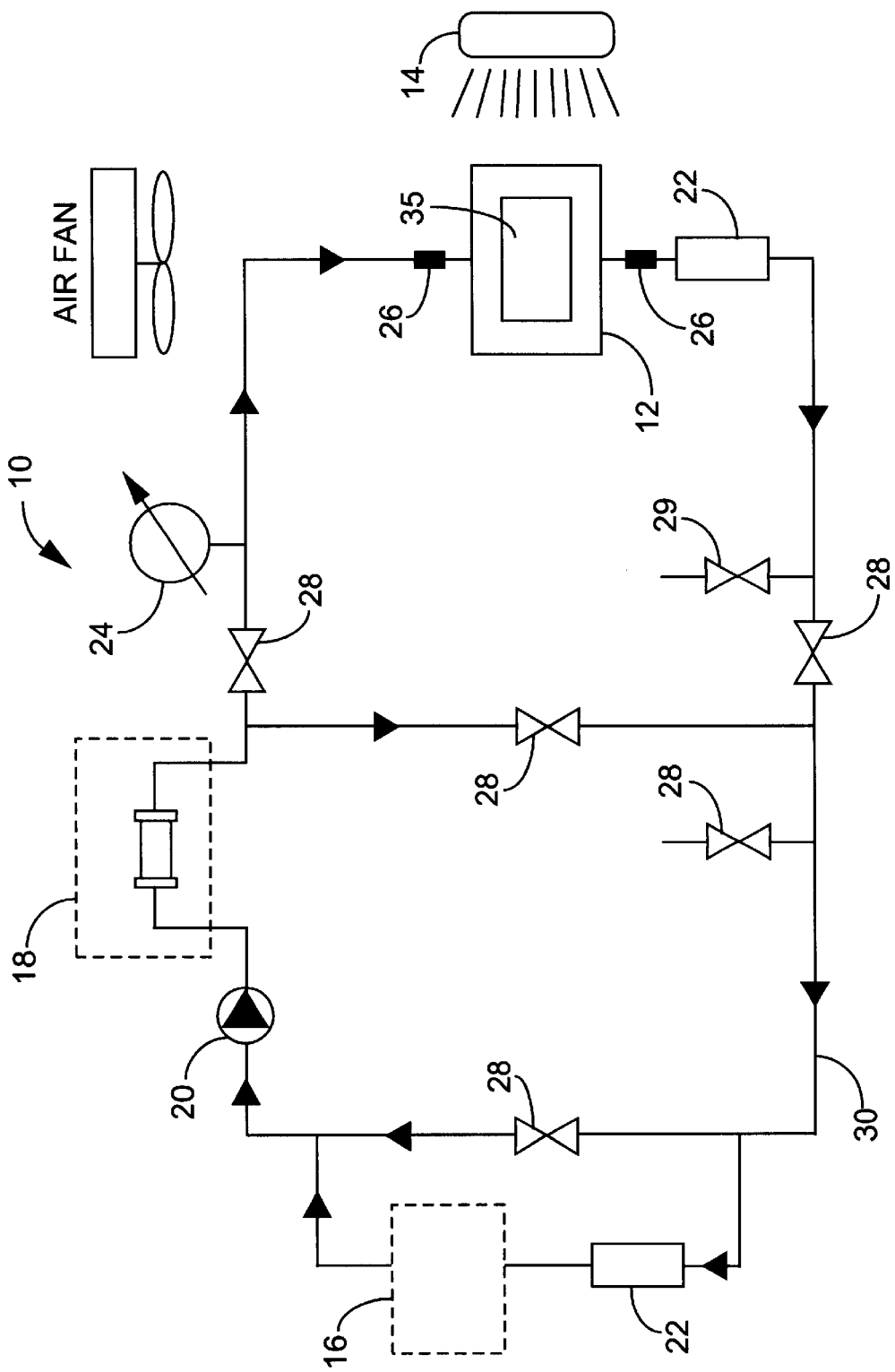
FIG. 1 is a diagrammatic view of a photocatalytic reaction system.

With respect to oxidation, essentially all organic compounds are thermodynamically unstable, yet condensed phase oxidation processes are not yet widely used for destruction of organic contaminants in air, water, wastewater or solid phases. Part of the reason is that oxidation processes are rate limited by the chemical kinetics, resulting in target organics reacting too slowly with the common oxidants such as oxygen or even ozone, which has a highly favorable redox potential. Another competing factor is that other non-target contaminants present may consume unacceptable amounts of the oxidants. This oxidant consumption load creates difficulty in maintaining oxidant concentrations at an acceptable level due to mass transfer problems. The end result is that the oxidation process becomes economically less feasible. Nevertheless, even with these problems, oxidation processes remain an attractive alternative for air remediation and waste treatment and are an area of intense research. The fact that oxidation processes are destructive of organic compounds and do not simply separate them from one phase to another as most treatment processes do is a particularly attractive feature for indoor air applications in that maintenance requirements are decreased in an era when waste reduction is the goal.

The ideal process for destruction of indoor air contaminants would consist of oxidation at ambient temperature and pressure. Such a process in which dioxygen is converted efficiently to atomic oxygen via a catalyst would be a very economical and effective treatment for air contaminants.

In attempts to optimize oxidation processes, recent research and development work indicate that oxidation rate limitations may be removed and lowered if conventional oxidants are replaced by combination of oxidants as well as combinations of oxidants with ultraviolet radiation. Such mixed oxidation systems have been labeled Advanced Oxidation Systems (AOS). Advanced Oxidation Systems display enhanced reactivity for many reasons, one of which is the higher generation of a variety of reactive free radicals. Of these free radicals, the most important is the hydroxyl radical which is an extremely powerful oxidant whose rate constant for attacking organic molecules is in the range of $1\times10^{8\rightarrow10}M^{-1}s^{-1}$. (See Table I.)

TABLE I

SOME SAMPLE OH RADICAL RATE CONSTANTS

| COMPOUND M | $k_{M,OH}$ $10^9 M^{-1} s^{-1}$ |
|---|---|
| benzene | 7.8 |
| 1-butanol | 4.6 |
| formic acid | 0.2 |
| pyridine | 3.8 |
| 2-chloroenthanol | 0.9 |
| vinyl chloride | 7.1 |
| toluene | 6.8 |
| tetrachloroethylene | 2.3 |

The very high reaction rate constant governing OH radical attack on organic compounds is noteworthy. It indicates that even if the steady-state concentration of OH radicals is only $10^{-10}$ to $10^{-12}$M, oxidation treatment of an organic substrate in an advanced oxidation process will be practical. This fact was illustrated by Glaze for the example of tetrachloroethylene whose rate constant with OH radicals is $2.3\times10^9 M^{-1}s^{-1}$. The pseudo-first order rate constant $k_o$, is given by $$k_o = -dln[M]/dt = (2.3\times10^9)[OH]_{steady-state}$$

The rate constant is so high that even with a steady-state concentration of only $[10^{-10}M]$ OH radicals, the half life of tetrachloroethylene is only 30 seconds. Such OH radicals can be produced in water and/or water vapor and films either by ultraviolet radiation, ozonation or photocatalysis.

With respect to photocatalysis, the low energy requirements and utility of semiconductors as photocatalysts have been demonstrated in numerous reports for the total oxidative degradation of a wide range of organic contaminants, including even odorants and complex molecules. Photocatalysis with irradiated semiconductors leads to highly effective, spatially controlled oxidations and reductions of organic and inorganic substrates, respectively. $TiO_2$, $SnO_2$, and their compounds with other such semiconducting metal oxides have a wide band gap and absorb light in the UV range (e.g., for $TiO_2$, light of wavelength <3700 angstroms is absorbed). $TiO_2$ in the anatase form is the most commonly used semiconductor for photocatalysis. When irradiated with the proper wavelength of UW light (which is present in ambient sunlight), electrons in the valence band of $TiO_2$ are excited into the conduction band. The reaction of UV light can be written as $$TiO_2 \xrightarrow{UV} exciton \longrightarrow h^+ + e^-$$

The electron holes (h+) which are produced by the excitation are powerful oxidizing agents—calculations show that their oxidation potential is sufficient for complete oxidation of nearly any contaminant. (This complete destruction is termed mineralization.) The oxidation is believed to occur through a hydroxyl radical:

$$OH^-ads + h^+ \rightarrow OH \cdot ads$$

Studies have shown that-,in the presence of air or oxygen, UV- irradiated $TiO_2$ is capable of complete destruction of methane, ethane, toluene, carbon monoxide, acetone, butanol, xylene, formaldehyde, and butyraldehyde, and odor compounds including acetaldehyde, isobutyric acid, toluene, methylmercaptan, hydrogen sulfide, and trimethylamine. Other studies have shown that in aqueous solutions $TiO_2$ photocatalyzes the complete oxidation of phenol, chlorinated phenols, dioxins, and polychlorinated biphenyls (PCBs), DDT, surfactants, saturated aliphatic hydrocarbons, and striazine. Contaminants are effectively decomposed by their interation with photoactivated surfaces, giving innocuous products. Other aqueous system studies have shown that photocatalysts are capable of inactivation of biological agents and complete destruction of pesticides. These contaminants may also be present in indoor air. These studies have proven the potential of photocatalytic oxidation to improve the quality of indoor air by destruction of chemical compounds from a wide variety of classes including volatile organic compounds (VOC's), and hydrocarbons (aromatics and nonaromatics), halocarbons, oxygenates (including carbon monoxide, alcohols, ketones, and aldehydes), sulfur-containing compounds, and amines. The results of studies on a phage, a pesticide, and on other complex molecules suggest that photocatalytic oxidation has promising potential to inactivate or destroy components of environmental tobacco smoke (ETS) and biological aerosols. Thus, photocatalysts, and in particular $TiO_2$, have great potential and the following specific advantages for both air and water decontamination:

1. The oxidation process occurs under ambient conditions, i.e., room temperature and pressure, with oxygen as the oxidant.
2. The formation of photocyclized intermediate products, unlike in the case of direct photolysis techniques, is avoided. In fact, while intermediates have been isolated in several of the studies cited above, the intermediates are also eventually mineralized. Thus, given sufficient residence time, complete mineralization can be achieved.
3. Oxidation of substrates is complete at high enough residence times (which depends on the catalyst's activity, available surface area, and availability to gases).
4. $TiO_2$ is inexpensive, nontoxic, and has a long catalyst life.

Titanium oxide aerogels can be made via a sol-gel process followed by hypercritical or supercritical drying. The process involves an appropriate titanium organometallic compound undergoing hydrolysis and then condensation in the appropriate solvent to form a particulate polymeric structure or a cluster aggregate structure, depending on whether the process is acid- or base-catalyzed. Acid-catalyzed gels are composed of interconnecting lattices of extremely small and uniform particles. Particle sizes as small as 1 nanometer are obtainable.

Unlike many metal alkoxides, titanium alkoxides undergo a very easy hydrolysis reaction, initiated even by atmospheric moisture. Hydrolysis and polycondensation of dilute solutions of titanium alkoxides have been investigated by several authors. Boyd obtained essentially linear polymers by the following partial hydrolysis reaction:

$$n\text{Ti(OR)}_4 + (n-1)H_2O \longrightarrow (RO)_3TiO[\overset{OR}{\underset{OR}{Ti}O}]_{n-2}Ti(OR)_3$$

in which R is an alkyl group. Various condensed products having the general formula $Ti_{3(x+1)}O_{4x}(OR)_{4(x+3)}$ were identified. It was also indicated that hydrolysis with water in an amount higher than shown above leads to precipitation of crystalline titanium compounds. However, it has been established that the polymerization rate is much higher between —OR and —OH than between two hydroxyl groups. As a result, $TiO_2$ gels with a highly polymerized network can be obtained by controlled hydrolysis and polycondensation of titanium alkoxides. It is preferable to delay polycondensation by using titanium alkoxides that have high molecular weight alkyl groups which create steric hindrance and by using acid catalysts that considerably decreases the rate of hydrolysis. These considerations allow the formation of transparent, blue tinted, monolithic $TiO_2$ gels that can be hypercritically dried to their aerogel form.

The actual steps of the synthesis involve titanium tetraisopropoxide in 2-propanol (23–25 vol. %) hydrolyzed by a solution containing acidified (HCl) water and 2-propanol. Homogenous gelation is achieved in a few minutes to several hours depending on the temperature. By using appropriate HCl concentration, the gel structure can be made anatase. The gel must then be hypercritically dried. First, solvent exchange is carried out with acetone followed by solvent exchange with liquid $CO_2$. Heating the $TiO_2$ gel filled with liquid $CO_2$ above its critical temperature creates a single phase inside and outside the gel and allows one to bleed off the $CO_2$ without collapsing the gel's high surface area structure.

Most reported aerogels of titanium oxide have surface areas quite low compared to silica aerogels. Surface areas of 80 $m^2$/g up to 110 $m^2$/g are typical of those reported. Unlike silicon oxide, the titanium oxide contracts upon undergoing annealing at high temperatures. To date, only slight improvements in these values have been reported for annealed titania aerogels. Recently, Schneider and Baiker reported 200 $m^2$/g for a $TiO_2$ aerogel prepared from acid-catalyzed tetrabutoxytitanium and calcined in flowing air A at 623 K.

While still in solution, both silica and titania gels possess extremely high surface area (>1500 $m^2$/g). Recently, ultra-low density (0.01 $g/cm^3$) silica aerogels with surface areas of about 2000 m²/g have been produced at Sandia National Laboratory by first refluxing a silicon alkoxide with only 65% of the stoichiometric amount of water required. This procedure produces a condensed silica oil consisting of long linear polymers similar to the linear polymers that Boyd achieved. The condensed silica along with the silicon alkoxide is used as a precursor for forming ultra high surface area gels. Based on Boyd's work, this technology should apply to titanium oxide aerogels.

The main obstacle in obtaining a dry, high surface area $TiO_2$ aerogel has been unnecessary annealing, probably because $TiO_2$ has been considered almost exclusively for thermal catalysis for which only its low surface area form is stable. Aerogels are annealed to make them thermally stable and to eliminate surface tension effects. At high temperatures silica aerogels lost their surface hydroxyl groups. The aerogels are thus transformed into aerogel glass. In contrast, titania aerogels require surface hydroxyl groups to be active for photocatalytic oxidation, which is in any case a low (ambient) temperature process. Annealing titania aerogels is thus an unnecessary step. Recently, Dagan prepared a non-annealed titanium dioxide aerogel with a surface area of 600 m²/g [4]. When compared to an annealed $TiO_2$ aerogel, it showed both an order of magnitude higher adsorption of an organic compound and an order of magnitude increase in the rate of photooxidation of that molecule. It is apparent that much like silicon dioxide, high surface area titanium dioxide aerogels can be obtained with the following characteristics: photocatalytic anatase form; surface area greater than 600 m²/g; and pore volume greater than or equal to 85%.

In recent work by Ruckenstein et al., surfactant modified hydrous titanium oxide gels were synthesized. Their gels exhibited improved adsorption capacity, pore volume, and mechanical strength. Small amounts of surfactants changed, in major ways, the characteristics and properties of these gels, such as the number of surface hydroxyl groups (which represent the main adsorption sites) as well as particle size and concentration of surface $Ti^{3+}$. As discussed earlier, these factors are important for photocatalysis. And, of critical significance, these factors are all affected by the surfactant-based synthesis technique. Thus, the following two characteristics were added to the aerogels: high density of hydroxyl groups (adsorption and photocatalyst sites); and even higher adsorption capacity due to surfactants.

A liquid surfactant is added to the sol-gel process in an attempt to template its morphology. All components including water can be solubilized by the surfactant. The surfactant is a nonionic ethoxylated compound known as IGEPAL™ CO-660. This surfactant, as well as other members of its family, is an effective solvent in the sol-gel process. Aerogels formed using these solvents exhibited reduced cracking upon drying. In addition, particle size and reaction rate are strongly dependent on the choice and concentration of surfactant.

The nonionic surfactant used leads to an isotropic gel and does not force the polymerization process into a hexagonal or lamellar geometry. It does, however, tailor the particle size and narrows the pore size distribution. The nonionic surfactant solvent for the sol-gel process represents a changeable parameter in determining the morphology of aerogels.

Alternative means of creating $TiO_2$ surfaces with high or ultra-high surface areas may include a one step hydrolysis and condensation of mixtures of silicon alkoxides and titanium alkoxides, and using a previously-formed ultra-high surface area silica aerogel as a template for a second hydrolysis and condensation of a titanium dioxide layer over the aerogel surface. A third method involves only a monolayer of $TiO_2$ laid down on the silica oxide lattice of the aerogel.

With respect to the one step binary aerogel, aerogels have been formulated from mixtures of 2 to 5 components. The essential barrier to multicomponent aerogels is whether the individual metal alkoxides share solubility in either a single or mixed solvent. For a $TiO_2$—$SiO_2$ binary aerogel, a single solvent system is all that is required. Solutions of $Si(OC_2H_5)_4$ and $Ti(OC_2H_5)_4$ in ethanol can be used to prepare aerogels. A strong acid catalyzes the hydrolysis reaction. Dilution and gelling temperatures are similar to those applicable to a pure $SiO_2$ system, but the polymerization rate is considerably increased by the addition of $Ti(OC_2H_5)_4$ and is further accelerated by heating. It is recognized that titanium alkoxides show a higher rate of polymerization than silicon based alkoxides. Besides the mixed Si—O—Ti bonds created during the polycondensation reaction, an increased number of Ti—O—Ti linkages should be expected when $TiO_2$ content increases.

The fast polymerization of titanium alkoxide under experimental conditions results in partly crystalline gels. The crystalline structure is identified as anatase. Results of several investigators using the same system show that the final structure of $TiO_2$—$XiO_2$ gels is strongly related to the processing parameters and particularly to the amount of the hydrolysis water.

In synthesizing aerogels whose compositions range from 5 to 50% $TiO_2$ in the binary aerogel, titanium isopropoxide and silicon tetraethoxide (TEOS) are used as precursors. Samples are prepared by a pre-hydrolysis method using nitric acid as the catalyst. The sol-gel is prepared by first adding ¼ of the stoichiometric amount of water into the desired amount of TEOS. Titanium isopropoxide is then added to the mixture under vigorous stirring. After mixing, additional water is added to complete gelation with a final water to alkoxide ratio of 16. The resulting clear solution is then aged two days before solvent exchange with acetone and then liquid $CO_2$ followed by hypercritical drying to form the aerogel.

With respect to the two step binary aerogels, the silicon alkoxide gel is first polymerized followed by flushing the gel with anhydrous ethanol followed by flushing with dilute titanium alkoxide in anhydrous ethanol. Alternatively, the silica can be completely fabricated in its ultra-high surface area form, heat treated to 135° C. to remove physically adsorbed water thus leaving a hydroxylated and partial alkoxylated surface and then immersed in a dilute solution of titanium alkoxide in anhydrous ethanol. There is no water present and the only reaction sites are surface sites. This procedure allows a slow hydrolysis reaction of titanium alkoxide at the surface. A previous experiment following this procedure, but using 10.3 wt. % of $Ti(OC_2H_5)_4$ in anhydrous ethanol, showed a 37% decrease in the surface area of the silica aerogel used. The surface area decrease was due to heavy coating of the surface by polymerized $TiO_2$.

A second aerogel-coating technique utilizes coupling agents. Tetra-functional organometallic compounds based on titanium, silicon, and zirconium make useful coupling agents because the central metal's tetravalency is conducive to electron sharing. Titanium ester-derived coupling agents have an advantage in their relative ease of building, thus providing specific function for a wide scope of composite applications. Only one example of coupling agents being used with an aerogel, in that case $SiO_2$, has been reported in the literature. Silane coupling to the aerogel surface created a hydrophobic organic layer which was pyrolyzed to create a carbon aerogel with significant electrical conductivity. It is proposed we use a similar technique to form a titanium oxide layer on an ultra-high surface area silica aerogel. Instead of silane coupling, titanium coupling agents are used to form a monomolecular film, which instead of being pyrolyzed, will be oxidized to $TiO_2$. By repeating this procedure, complete coverage of the silica surface by $TiO_2$ should be possible with coating thicknesses ranging from monolayer to multilayer. The silica aerogel can be made with surface area up to 2000 $m^2/g$. Surface modification with a $TiO_2$ monolayer should not significantly lower the surface area if pores are sufficiently large that blockage does not occur. Surfactant-templated silica aerogels should be ideal for this purpose.

EXAMPLES

Two catalysts have been studied. First, anatase titanium dioxide powder (Aldrich, 99.9% anatase titanium IV oxide) was used as supplied. A reactor cell (described below) contained 3.74 g of $TiO_2$ (BET=2.3 $m^2/g$) which corresponds to a catalyst bed volume of 48.5 $cm^2$. The second catalyst was a pure titanium dioxide aerogel which had been synthesized. Unlike the silicon alkoxides that usually require a catalyst to drive their reaction with water, the high reactivity of titanium alkoxides with water poses significant problems to creating titanium aerogels of the required form. The addition of the smallest amounts of water to the titanium alkoxides formed precipitates and not the uniform gelation required to create aerogels. However, addition of a specific amount of the acetic acid to the solution resulted in a continuous monolithic titanium gel that could then be supercritically dried to its aerogel form. A pure titanium oxide low density aerogel was synthesized using the excess water method. Titanium (IV) iso-propoxide (97%, Aldrich), ethanol (anhydrous, Aldrich), and acetic acid (99.5%, Fisher Scientific) were mixed in a beaker according to a molar ratio of Ti:EtOH:AAc=1:12:9. Then, under constantly stirring, deionized water was added at a ratio of $Ti:H_2O$=1:40. The gelation time was 4–5 days forming a transparent gel with slightly cloudy appearance. After washing with acetone, the sample was the supercritically dried using carbon dioxide as supercritical fluid. A reactor cell was loaded with 1.33 g of aerogel (BET=423 $m^2/g$). The properties of both catalysts are summarized in Table II.

TABLE II

PROPERTIES OF ANATASE AND AEROGEL

| | ANATASE | AEROGEL |
|---|---|---|
| Mass | 3.74 g | 1.33 g |
| Illuminated Area | 48.5 $cm^2$ | 26.6 $cm^2$ |
| Catalyst Volume | 3.85 $cm^3$ | 2.11 $cm^3$ |
| Specific Surface Area | 80 $m^2/g$ | 423 $m^2/g$ |

FIG. 1 illustrates a reactor system 10 used to study the catalysts. The primary components of the reactor system 10 are as follows: a photocatalytic reactor cell 12, a UV light 14 (300 Watt, Ace Glass), GC-analyzer 16 (Sigma 300, FID, Perkin Elmer)+ Varian Integrator 4270, an infra-Red Cell and Spectrophotometer 18 (Model 500, Buck Scientific), a pump 20 (Metal Bellows Corp. Model MB-41, stainless steel bellows), a pair of flow indicators 22 (Cole Parmer), a pressure gauge 24, a pair of quick connects with filter 26 (Cajun 316 VCR), six valves 28 (Nupro), and stainless steel tubing 30 (¼ in OD).

A bypass around the photocatalytic reactor cell 12 was implemented to avoid a high pressure drop across the catalyst bed formed in the photocatalyst reactor cell 12. The quick connects 26 with filter gaskets were placed before and after the reactor cell 12 to prevent catalyst powder from being purged into the system tubing and to allow for an easy change of the reactor cell. The high capacity pump 20 was implemented to ensure faster mixing of the contaminant after introduction to the reactor loop.

Figure 2:
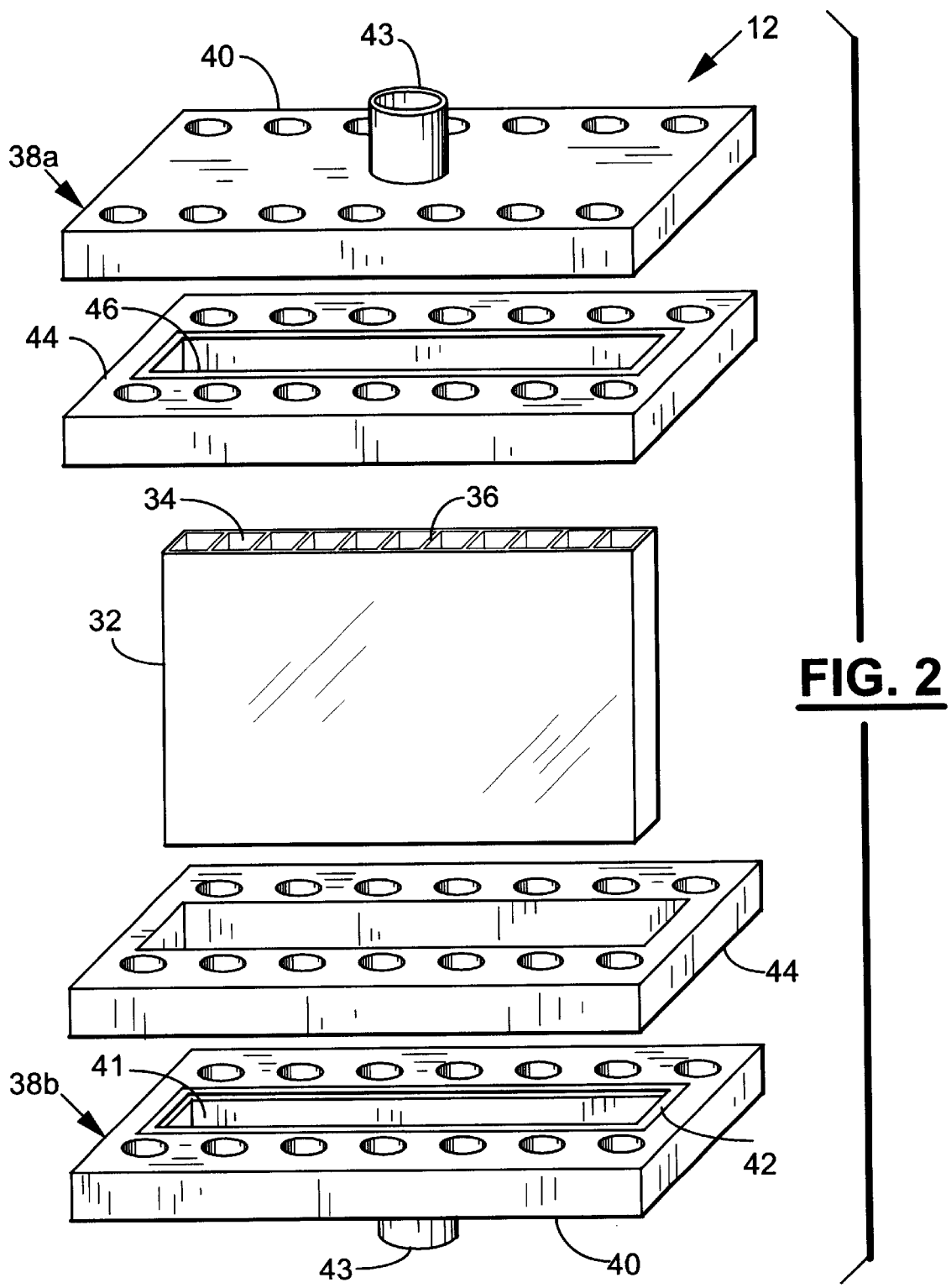
FIG. 2 is an exploded, perspective view of a photocatalytic reactor cell used in the photocatalytic reaction system of FIG. 1.

FIG. 2 shows the photocatalyst reactor cell 12 in greater detail. The photocatalyst reactor cell 12 includes a quartz glass cell 32 with a space 34 formed therethrough for receiving a catalyst bed represented by the reference numeral 35 in FIG. 1. The glass cell 32 is 3 in×5 in with the space 34 being 1/32 wide. The glass cell 32 is sealed with glass on both sides, is open at the bottom, and has glass spacers 36 on top to provide for an even flow distribution. The glass cell contains small layers of glass wool (not shown) at both ends to hold the catalyst powder in place.

The glass cell 32 is supported by a pair of aluminum frames 38a and 38b. Each frame 38a and 38b includes a first portion 40 that has a cavity 41 positionable over a corresponding end portion the glass cell 32 and a silicone seal 42. Each first portion 40 is further provided with an opening 43 in communication with the cavity 41. It should be appreciated that the opening 43 of the frame 38a serves as an inlet and the opening 43 of the frame 38b serves as an outlet or vice versa. Each frame 38a and 38b further includes a second portion 44 that is provided with a raised edge 46 for engagement with the silicon seal 42. Upon pressing together of both portions 40 and 44 (using 14 screws) (not shown) the silicon seal 42 is pressed against the glass cell 32 and provides sealing of the components.

Figure 3:
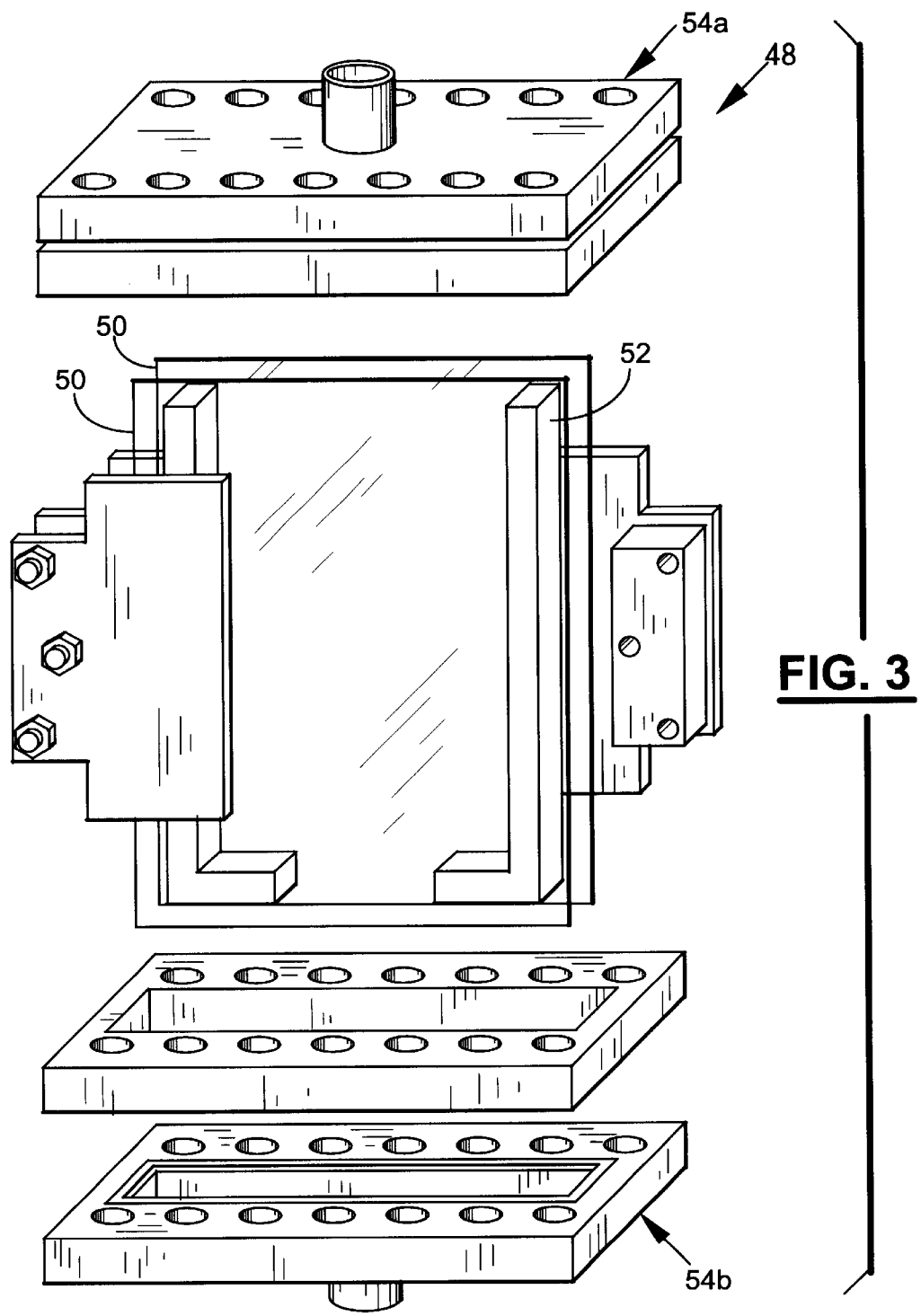
FIG. 3 is an exploded, perspective view of another emobodiment of a photocatalytic reactor cell.

An alternative reactor cell 48 is illustrated in FIG. 3. In cell 48, the sealed glass cell is replaced with two glass plates 50 separated by a gasket 52 of variable thickness and held together by two clamp-like frames 54a and 54b. This design will be used for experiments to optimize the catalyst bed thickness.

The IR (Buck Scientific M-500) scans the wavelengths from 4000 $cm^{-1}$ to 600 $cm^{-1}$ during a standard scan of the gas in the main system loop. The IR can also continuously scan and record data at a single wavelength. The IR cell (Buck Scientific 6802) is 5 cm long with NaCl windows and is connected directly to the main system loop with stainless steel flexible tubing (Cajon 321-4-X-24B2). The IR is controlled by an IBM Personal Computer (IBM PS2 Model 50). The software used to view and analyze the IR data is "Spectra Calc," by Galactic Industries Corporation.

The purpose of the IR is to enhance the detection capabilities of the GC and the Mass Spectrometer. It is believed that the results of the combined GC data, mass spectrometer data, and IR data will give a better description of the reaction systems under study than the GC data and mass spectrometer data alone.

The IR system has come on line recently and is undergoing calibration. It has taken considerable effort to calibrate the IR system thus far. Calibration of the IR system includes but is not limited to:
1. Determining the optimum IR cell size to use;
2. Isolating computer interface problems; and
3. Calibration of the IR beam.

Determination of the optimal IR cell size involves selecting an IR cell that is not too small nor too big. If the IR cell is too small, gases at very low concentrations may not be detected. If the IR cell is too large, it will be very difficult to obtain accurate kinetic data because the volume of the system will be so big that gas phase concentration changes will be difficult to detect over short time periods. The 5 cm cell was chosen over the 3 meter cell for this reason.

The IR beam was checked periodically to insure that there was no wavelength shift in the IR scans. If the wavelengths are shifted, it is much more difficult to identify the chemical bonds present.

Figure 4:
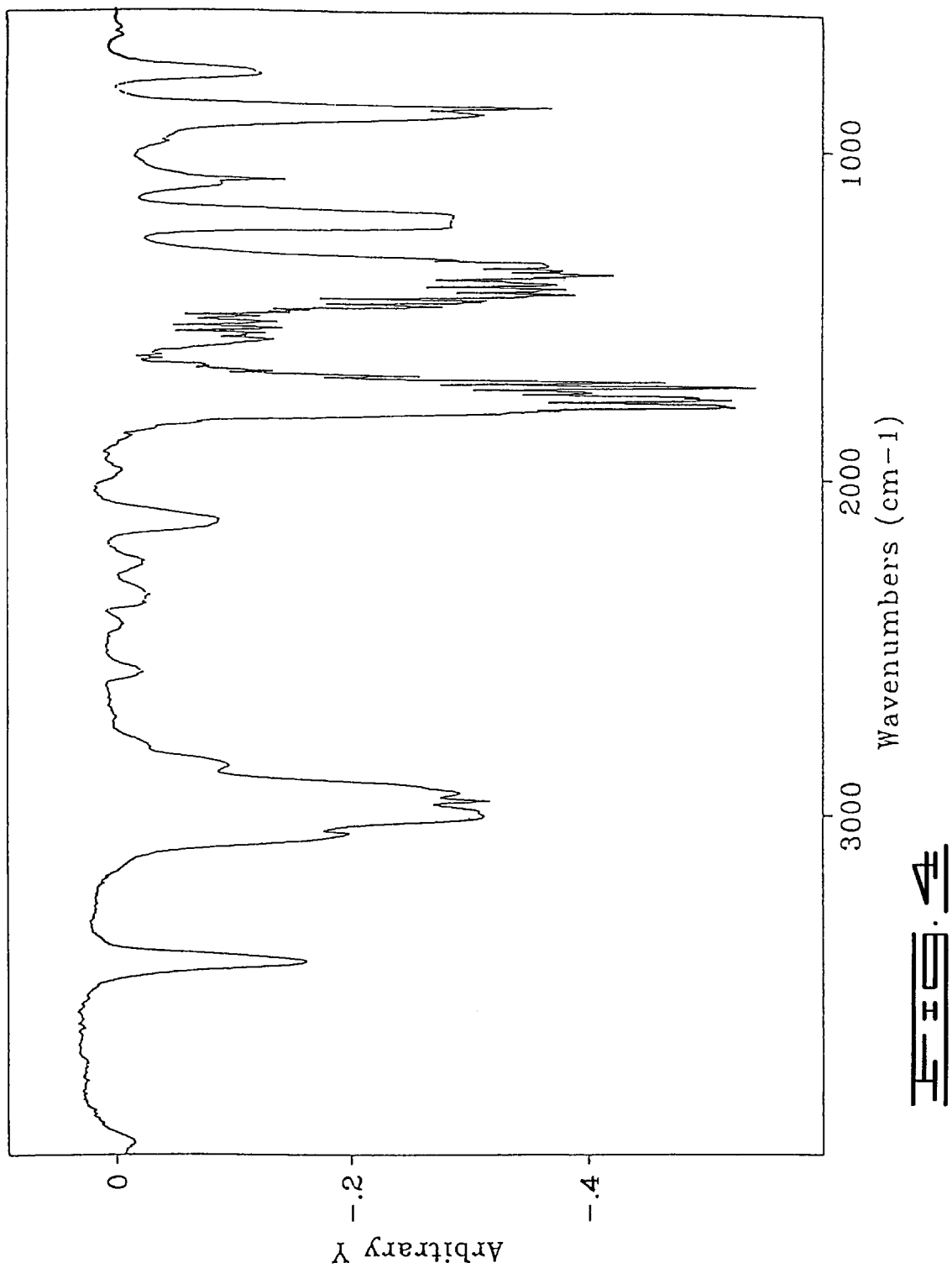
Figure 5:
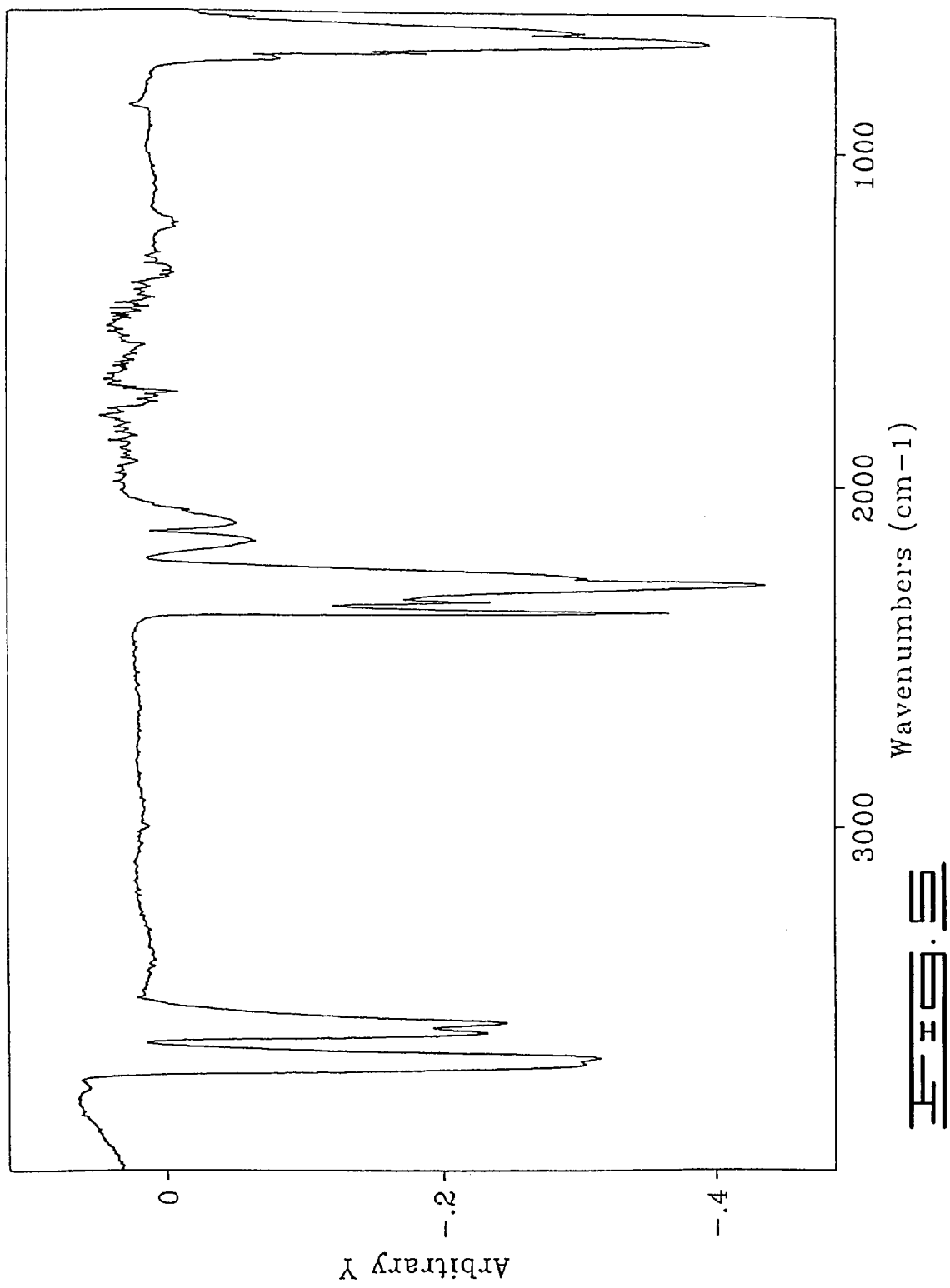
FIG. 5 shows the IR scan 46 hours after UV light was initiated.

The initial IR results are shown in FIGS. 4 and 5 for the aerogel catalyst. FIG. 4 shows the IR scan of the gas phase before the UV light was switched on. FIG. 5 shows the scan 46 hours after the UV lamp was initiated. The peaks at 3432, 3000, 2572, 2430, 1772, 1430, 1201, 1090, 882, and 775 $cm^{-1}$ are considered nonexistent 46 hours after turning on the UV light, as seen in FIG. 5. The product peaks in FIG. 5 at 3684, 3579, 2374, 2297, 689 $cm^{-1}$ have not been positively identified yet.

The gas from the system is automatically injected into the GC (Perkin-Elmer Sigma 300 Gas Chromatograph) to a determined time interval, i.e., every hour, by a pneumatically actuated valve. To an adjusted time interval, the following events occur for the automatic sampling:
1. The timer sends a signal to the integrator (Varian 4270) to begin analysis.
2. The integrator then triggers an electrically controlled valve (Humphrey 41E1), which then triggers a pneumatic valve (Valco AH90).
3. The pneumatic valve then remains in the "sampling" position for 15 seconds to thoroughly fill a sampling loop with the system gas.
4. The integrator then shuts the electrically controlled valve, which in turn, causes the pneumatic valve to inject the gas from the sampling loop into the GC column.
5. 15 minutes later, the integrator ends analysis and prints the results.
6. The process repeats after a predetermined time interval, i.e., 60 minutes.

Experimental Results

GC-calibration

Figure 6A:
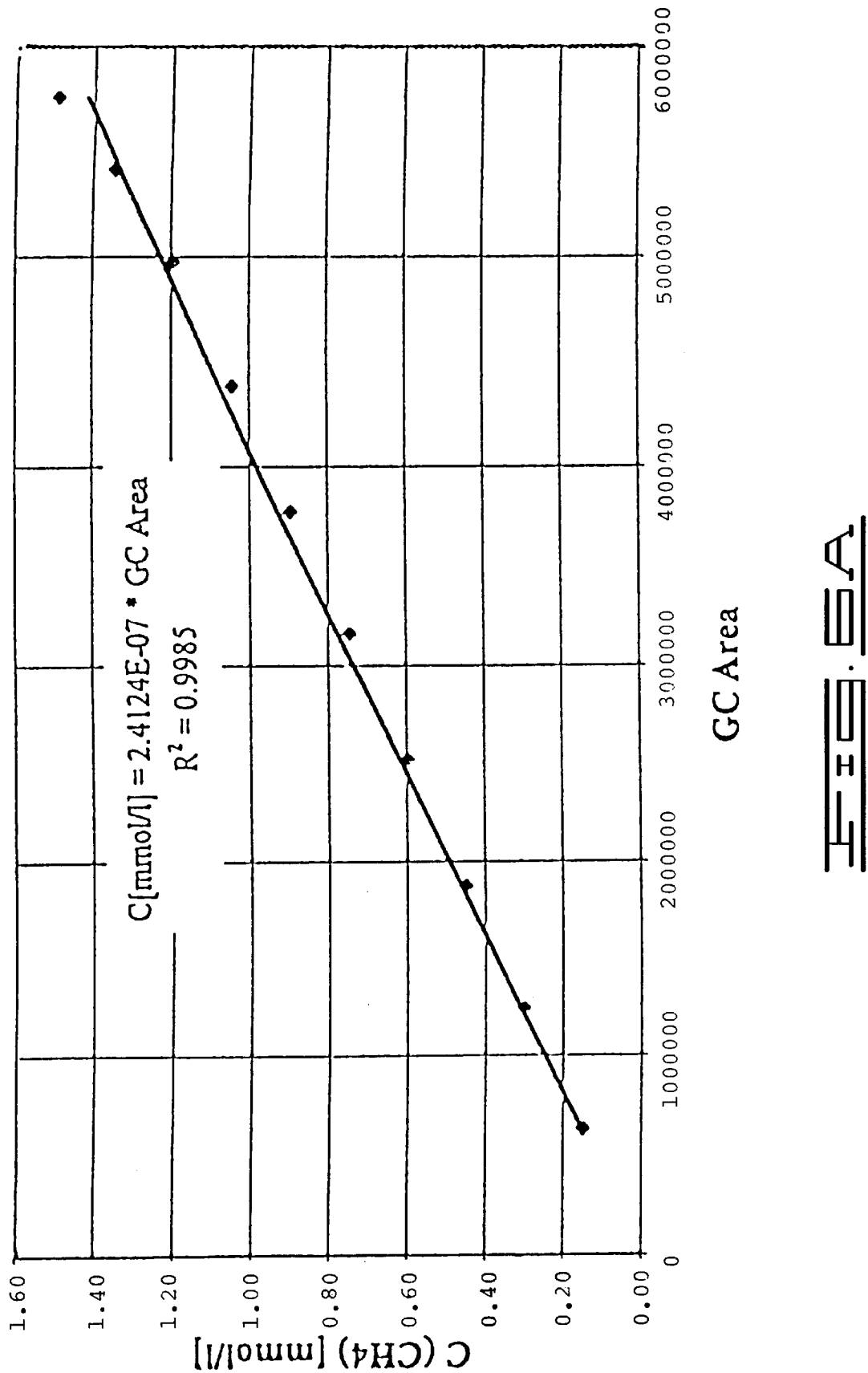
FIG. 6A is a graphical representation illustrating the GC-Calibration curve for methane.
Figure 6B:
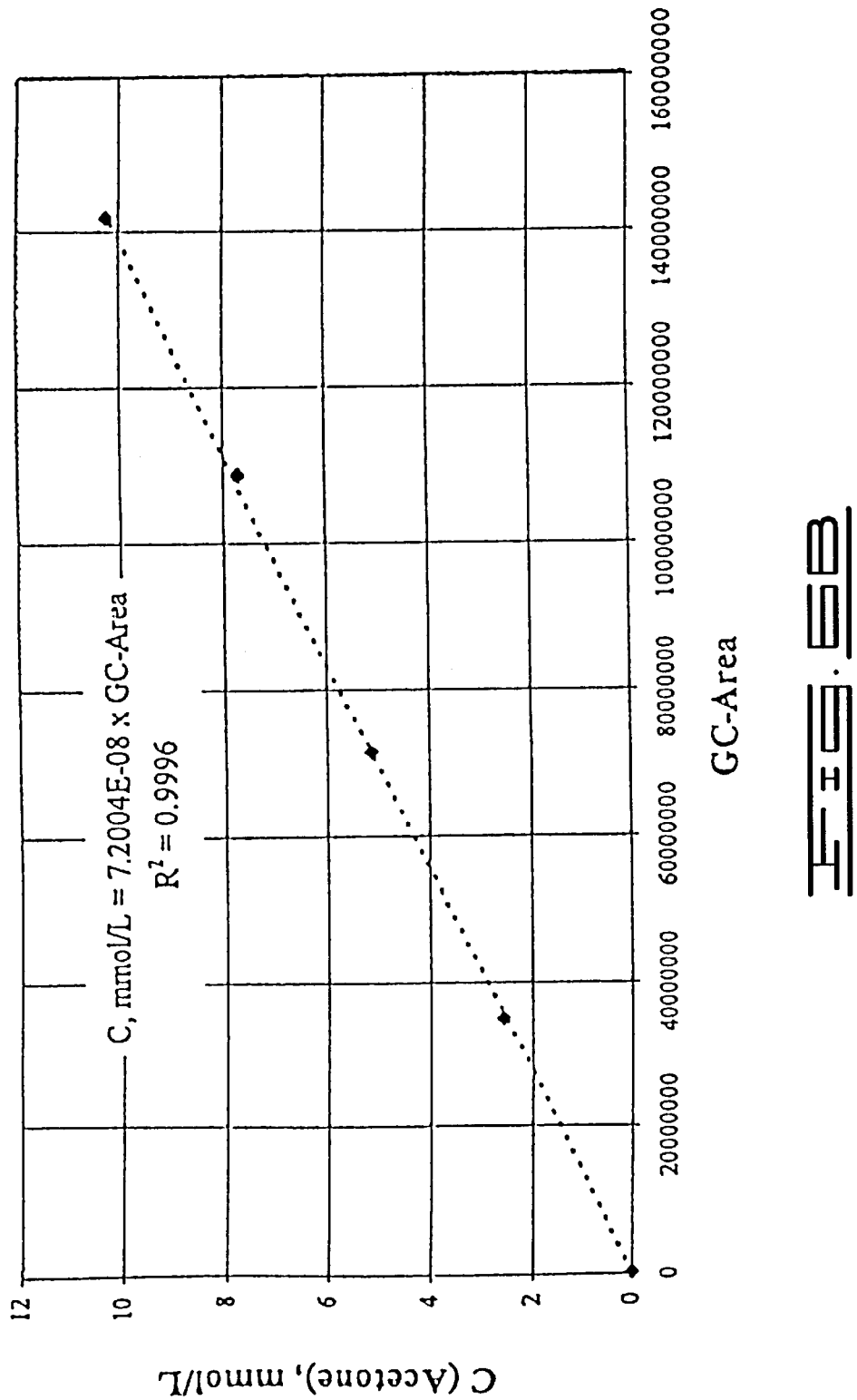
FIG. 6B is a graphical representation illustrating the GC-Calibration curve for acetone.

The GC-Analyzer was calibrated for methane and acetone. This was done by successive injection of known amounts of acetone (or methane) into the reactor loop not containing the photocatalytic reactor cell 12. The GC readings (area) were recorded and plotted versus the calculated concentrations in the reactor loop. Linear regression was applied to obtain the calibration equations as shown in FIGS. 6A and 6B.

Reactor Volume Determination

The volume of the system, $V_{sys}$, was determined by helium expansion. The reactor system was initially purged with helium and then evacuated using a vacuum pump (Fisher Scientific Mod. 5KH32FG 115E). The pressure, $P_{vac}$, was recorded. An external cylinder of known volume, $V_{cyl}$, was filled with helium at atmospheric pressure, $P_2$, was recorded. By applying a simple mass balance, the volume of the reactor system was determined using the pressure difference of the expanded gas and applying the ideal gas law (equation [1]):

$$PV=nRT \quad [1]$$

where
P=Pressure
V=Volume
T=Temperature
n=number of moles
R=Universal gas constant Considering the fact that the number of moles, $n_1$, in the cylinder before expansion is the same as the number of moles in cylinder and reactor system after expansion, $n_2$, we find by applying of equation [1] that $$n_1=n_2 \quad [2]$$

or $$P_1V_{cyl}=P_2(V_{cyl}+V_{sys})-P_{vac}(V_{sys}) \quad [3]$$

Because it is not possible to draw an absolute vacuum to the system, the term $(-P_{vac}(V_{sys}))$ in [3] had to be added to the equation to account for the mass of helium that is left after evacuation. The only unknown in [3] is $V_{sys}$ which can be easily solved for. The volume of the reactor system was found to be about 300 ml. The exact value varied due to alterations in the reactor loop set-up and was redetermined after every change of the reactor set-up.

Adsorption Studies

Since acetone adsorbs strongly on the catalyst, an adsorption study was carried out on both catalysts, anatase powder and aerogel. These data were needed to calculate the reaction rates and reaction rate constants.

Figure 7:
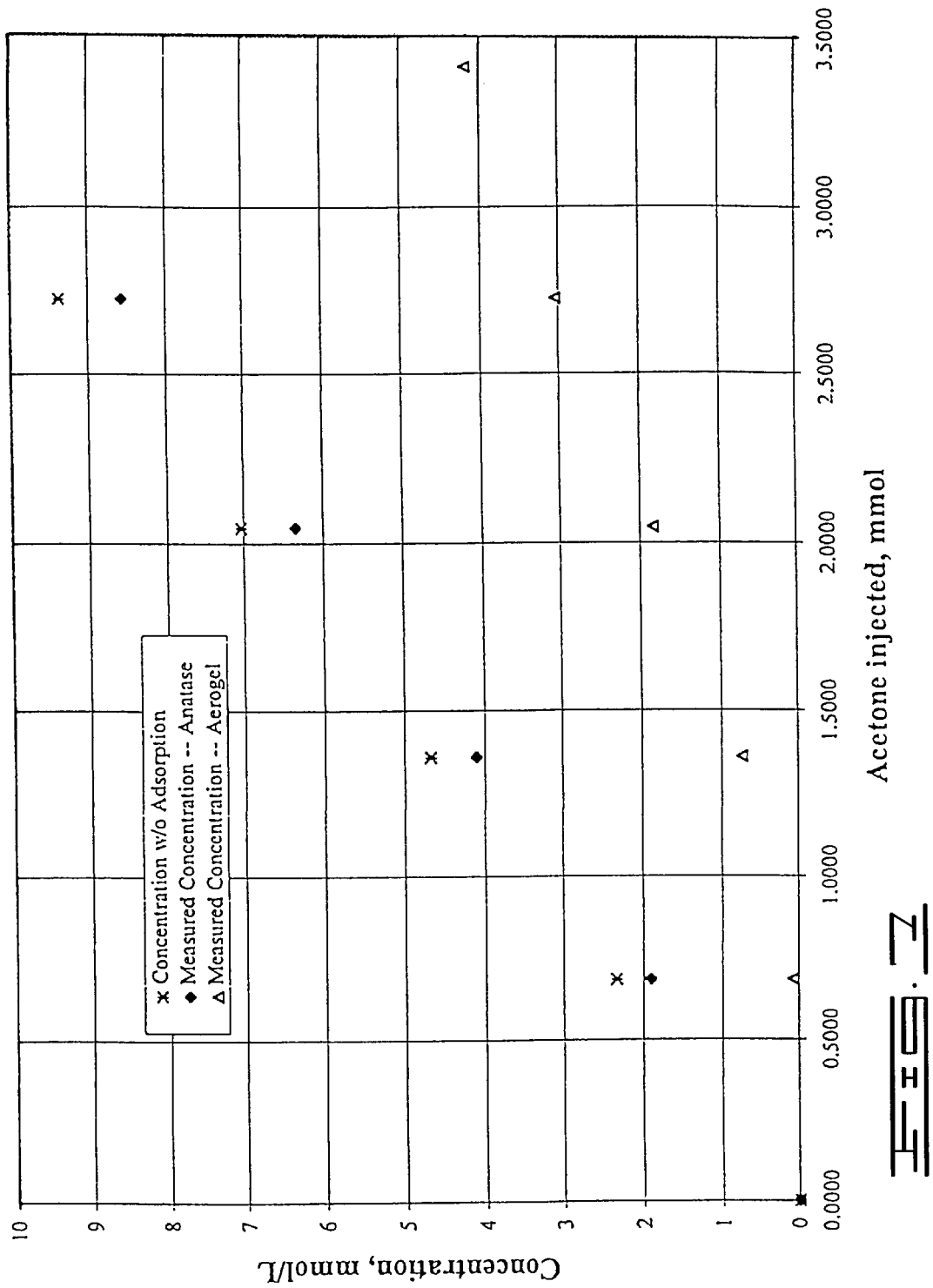
FIG. 7 is a graphical representation illustrating acetone adsorption for aerogel and anatase powder catalysts.

Successive increments of acetone were injected into the reactor loop which included the reactor cell. The amount of acetone adsorbed on the catalyst, $m_{ads}$, was determined from the difference of the gas phase concentrations if no adsorption occurred, $C_{exp}$, and the actual measured concentrations, $C_{meas}$.

$$C_{exp}=V_a^{inj}*\mathsf{P}_a/V_{sys} \quad [4]$$

$$m_{ads}=(C_{exp}-C_{meas})V_{sys} \quad [5]$$

where $V_a^{inj}$=Volume of acetone injected
$V_{sys}$=Volume of system
$P_a$=Density of acetone FIG. 7 demonstrates the higher adsorption capacity of the aerogel compared to the anatase. Methane adsorption was very low and could not be accurately measured with this apparatus. The concentration reading from the GC after injection of methane into the reactor system was identical (within experimental error) to that which would occur in the absence of adsorption. The low adsorption of methane, combined with its chemical stability, account for its much slower rate of oxidation compared to acetone (as described later).

Studies of Photocatalytic Activity

Methane

The catalytic reactor cell was placed one foot away directly in front of the UV-lamp. Before starting each run, the entire reactor system was purged with dry air. The pump continuously circulated the gas throughout the system. GC measurements were taken for about one hour to assure that no other components are left in the system. Then, methane vapor was injected to the system. GC readings were observed until a constant baseline was established typically one to two hours. Then, the UV light was switched on. An air fan circulated room air around the photo cell which established temperatures at the cell varying from 27–29° C. The pressure in the system was P=1 atm. The flow rate across the cell was 65–75 ml/min. Automated GC readings were recorded every hour until no methane peak was observed or the concentration remained nearly constant. Experiments with five different initial concentrations of methane were performed by injecting 0.5, 1, 2, 6, and 10 ml of methane at P=1 atm which corresponds to concentrations varying from 0.07 to 1.5 mmol/L. The maximum timer per experimental run was 50 hours.

Figure 8A:
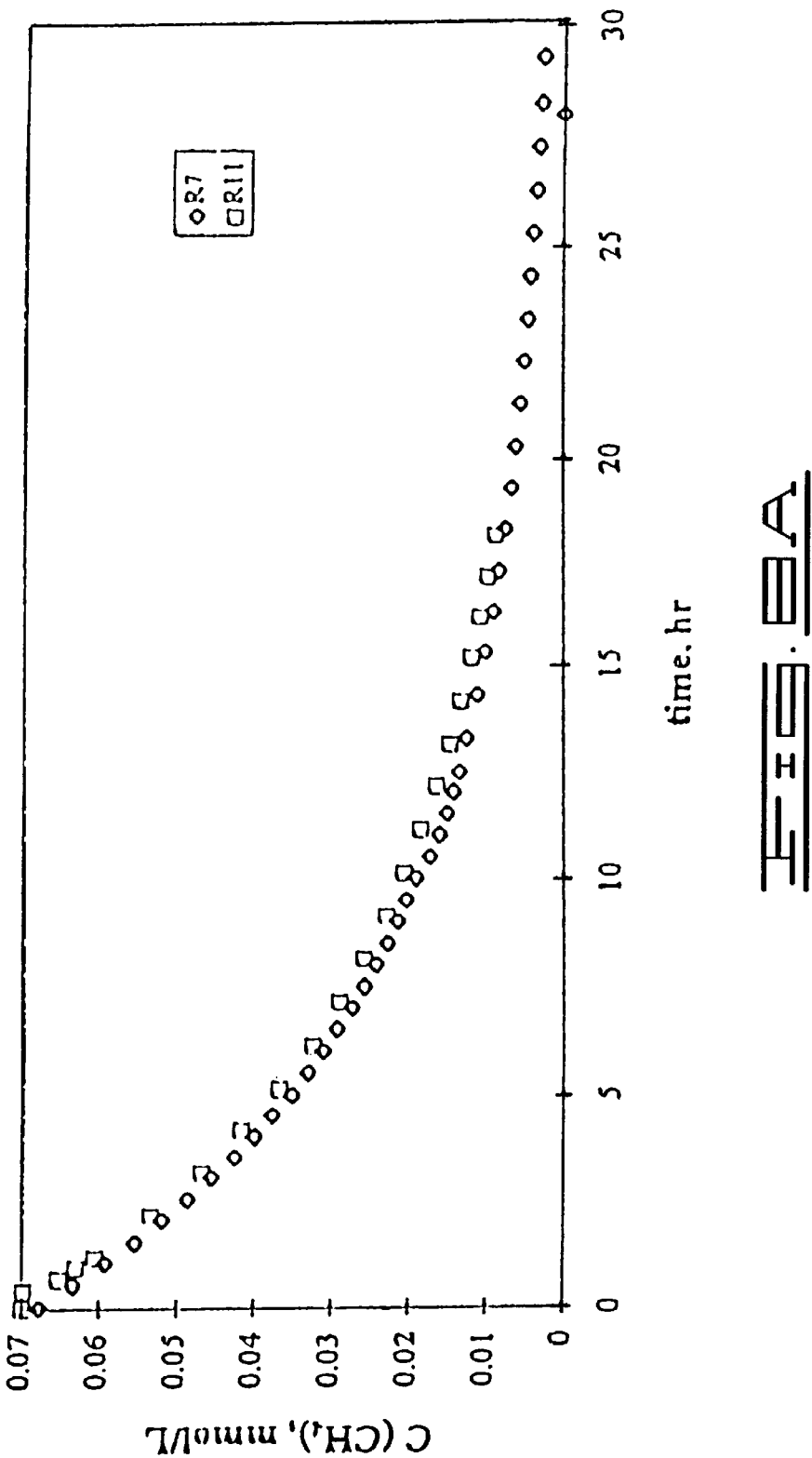
FIG. 8A is a graphical representation illustrating methane concentration dependence on time for aerogel catalyst.
Figure 8B:
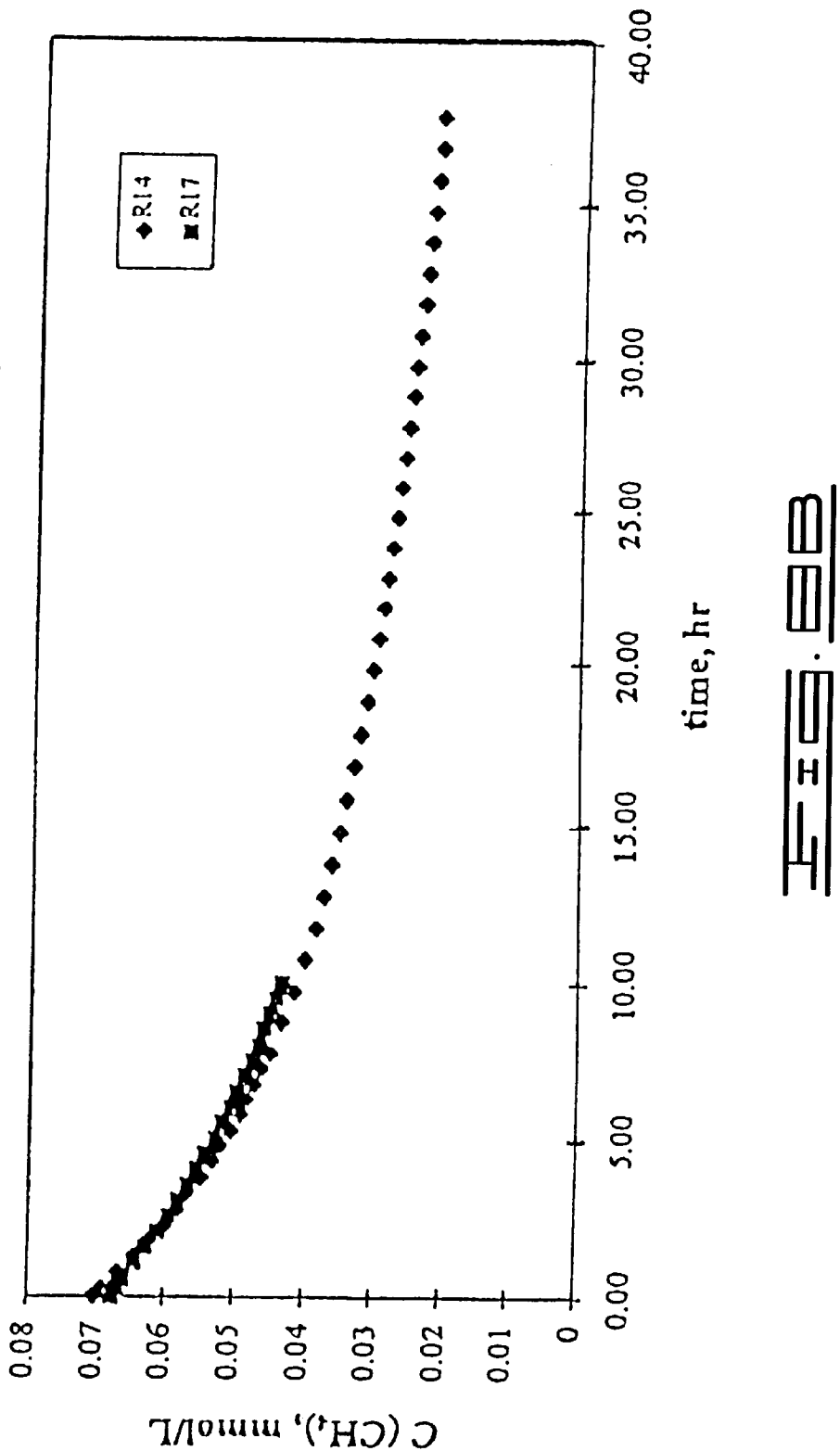
FIG. 8B is a graphical representation illustrating methane concentration dependence on time for anatase catalyst.
Figure 9:
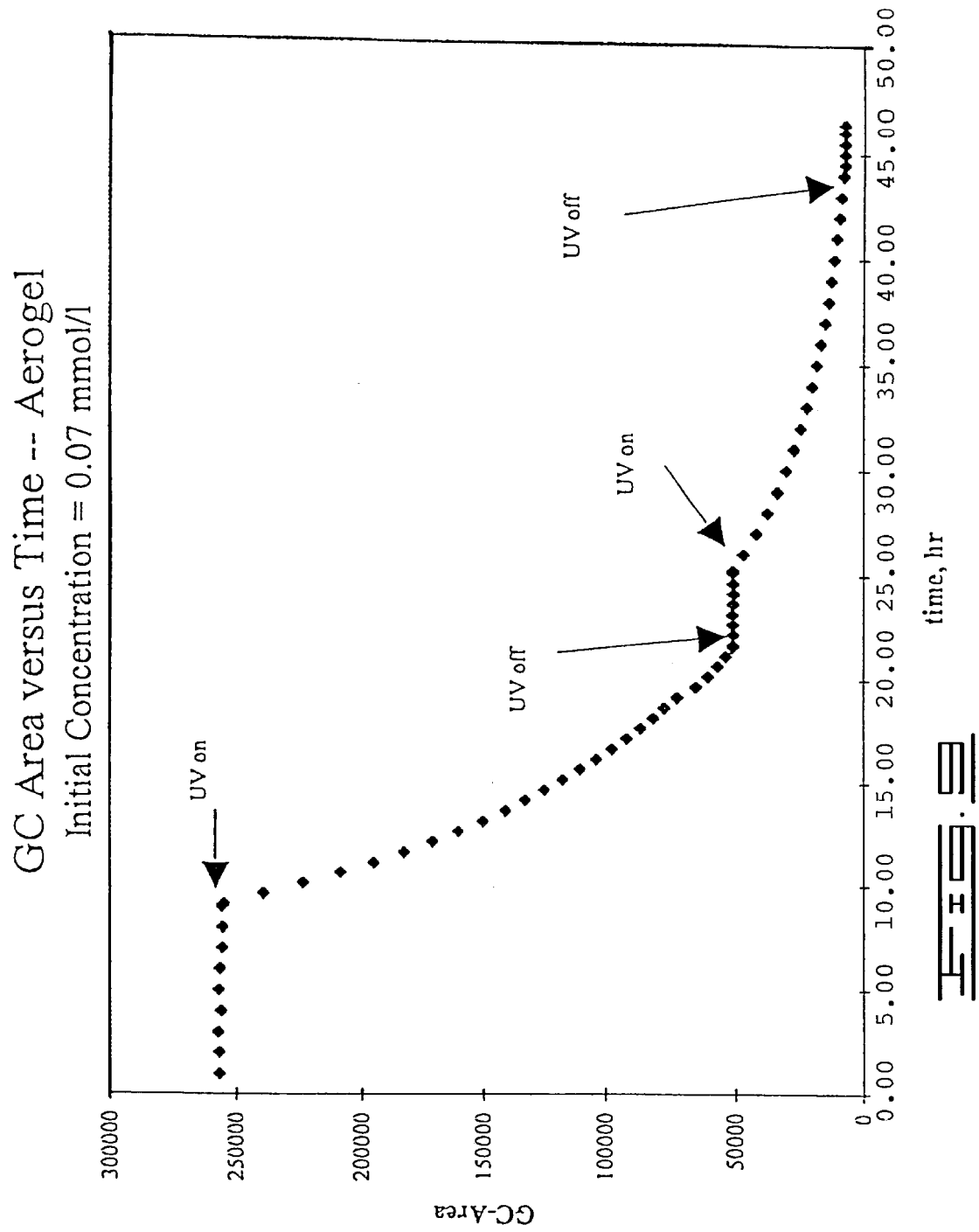
FIG. 9 is a graphical representation of methane concentration dependence on UW illumination and reaction time.

FIGS. 8A and 8B show the change of methane concentration with time for two runs at the same initial concentration. The data are highly repeatable and the catalyst is reusable with little or no alteration in its activity. A different study was performed where the UV light was shut off during an experimental run. FIG. 9 indicates that no reaction occurs during UV off times. Moreover, upon reinitializing of the UV light the change in concentration continues at the same trend as it was before the interruption. From this, it can be concluded that UV light is necessary for activation of each reaction site. In addition, the catalyst activity does not change with the duration of UV light exposure. An earlier study, in which methane was circulated through a reactor cell containing no catalyst but with the UV light on, showed that methane oxidation is not catalyzed by UV light in the absence of the catalyst.

Figure 10A:
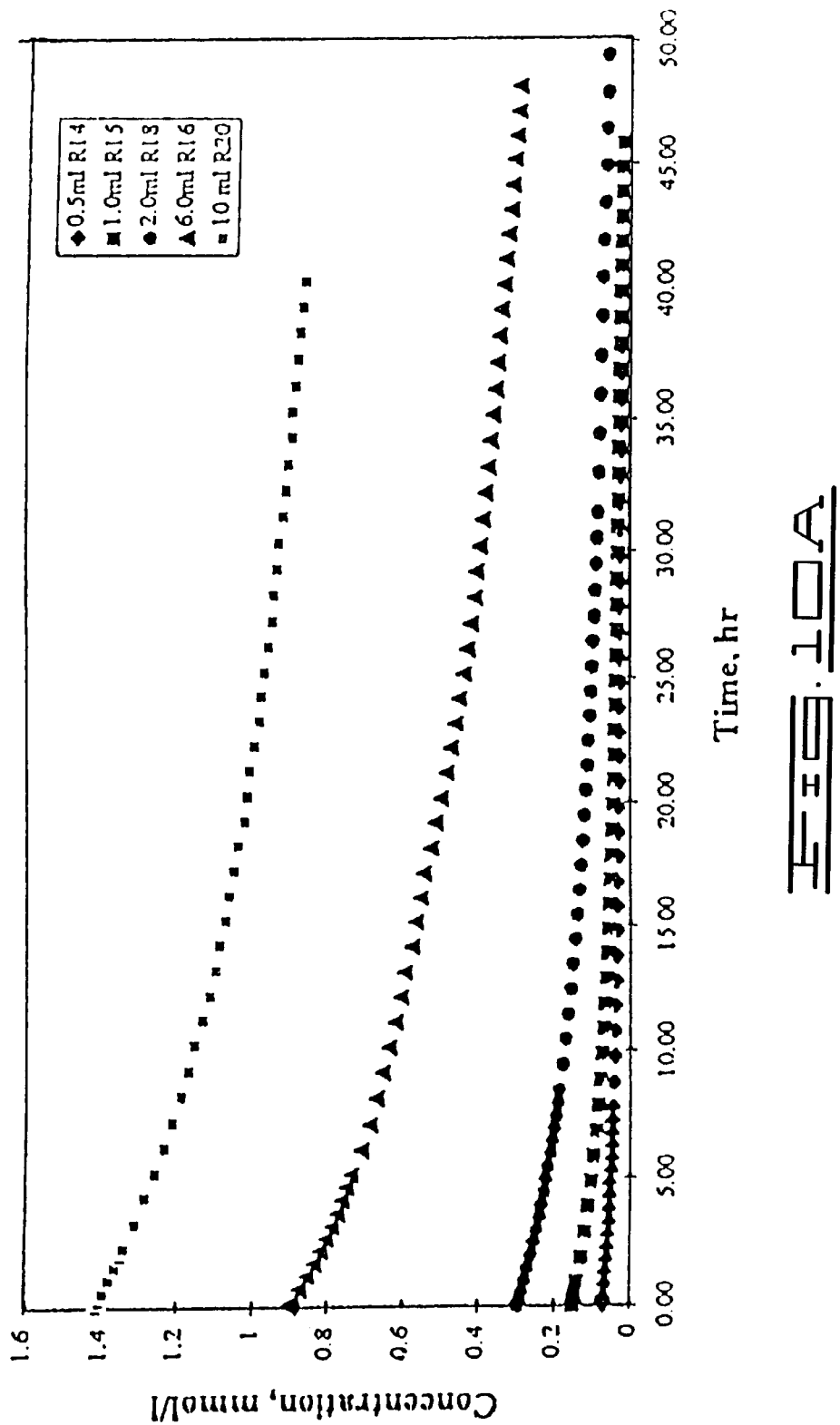
FIG. 10A is a graphical representation of methane concentration dependence on time at different initial concetrations for anatase powder.
Figure 10B:
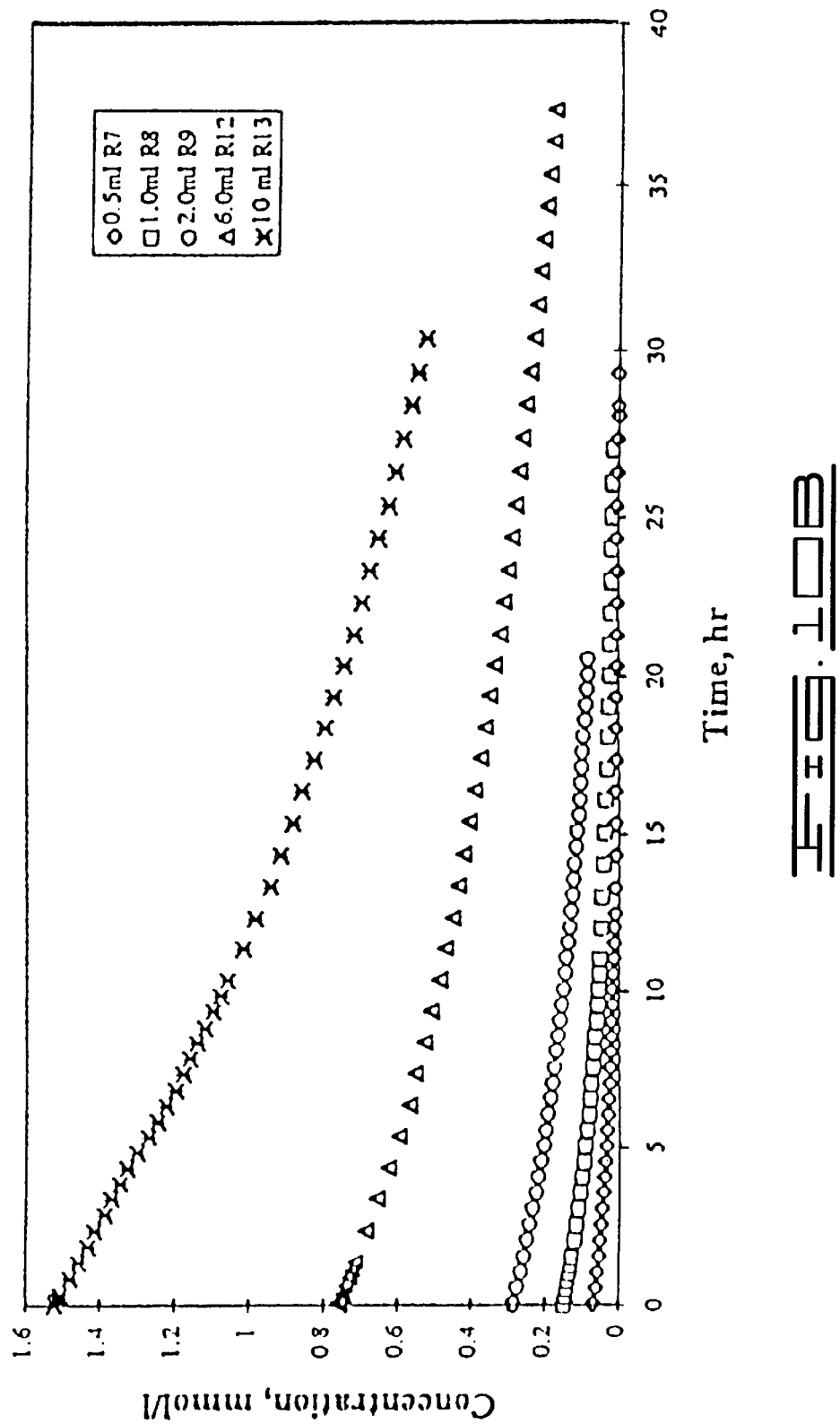
FIG. 10B is a graphical representation of methane concentration dependence on time at different initial concetrations for aerogel.
Figure 11A:
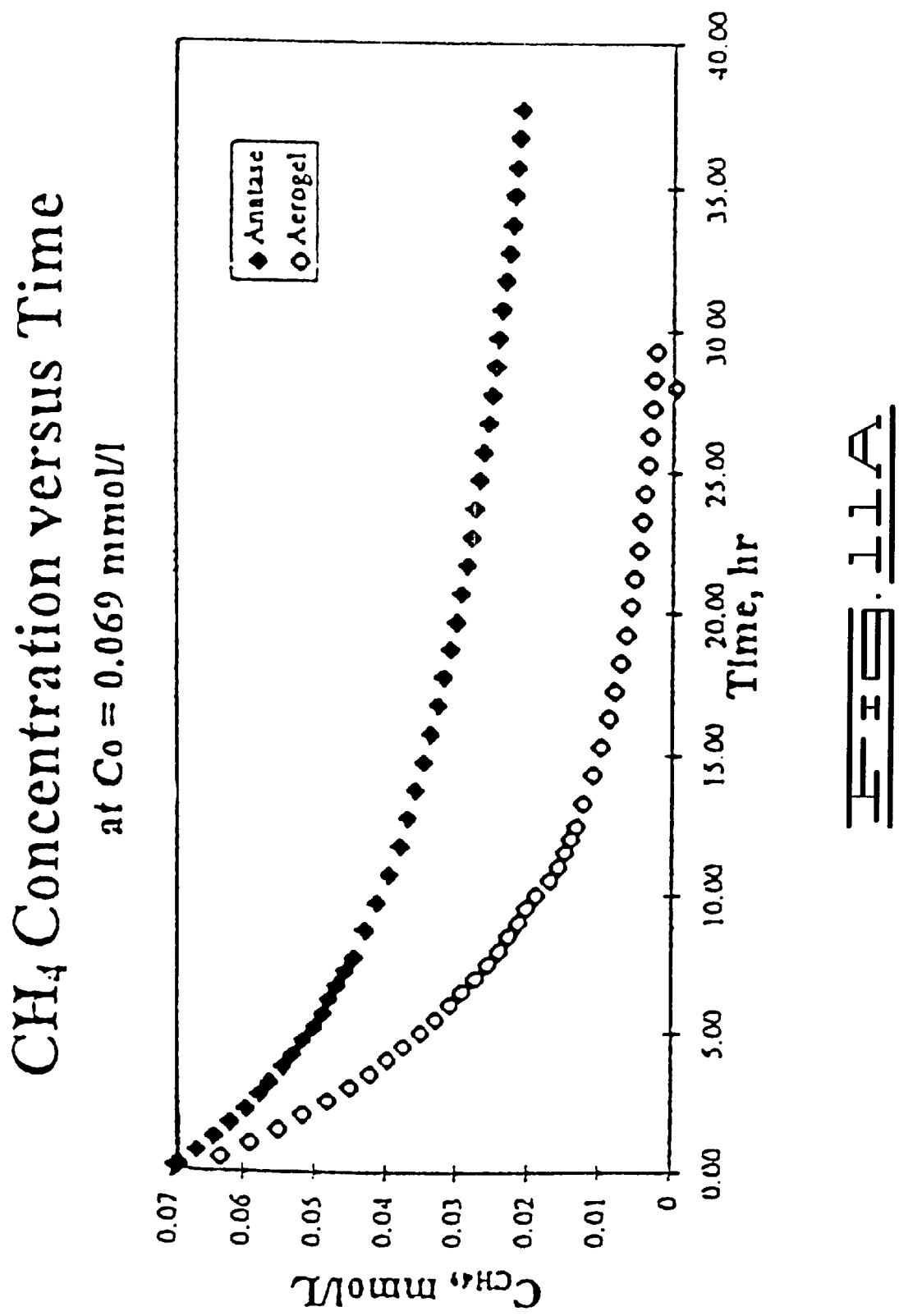
FIGS. 11A–11D are graphical representations comparing the change in methane concentration with time for aerogel and anatase at different inital concentrations.
Figure 11B:
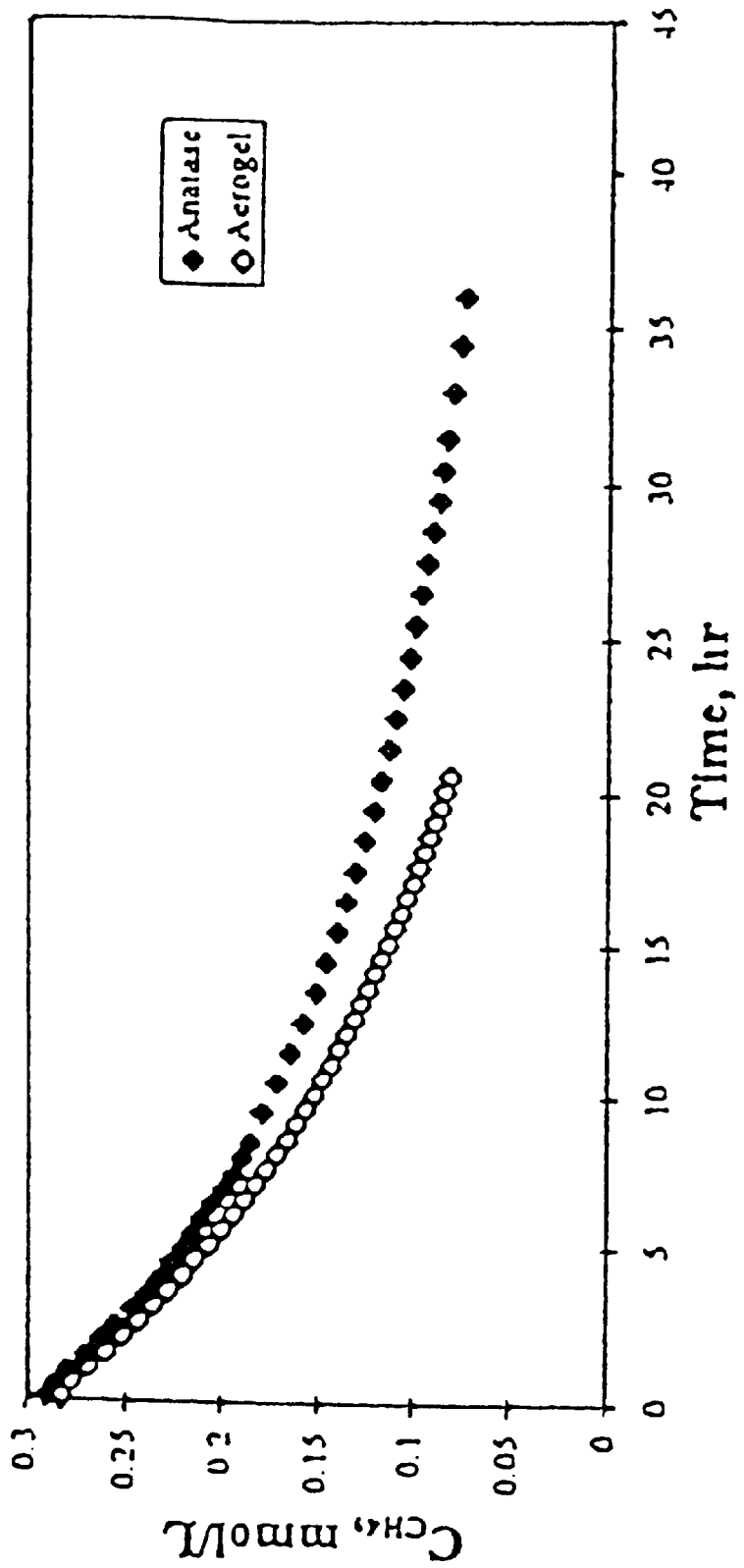
Figure 11C:
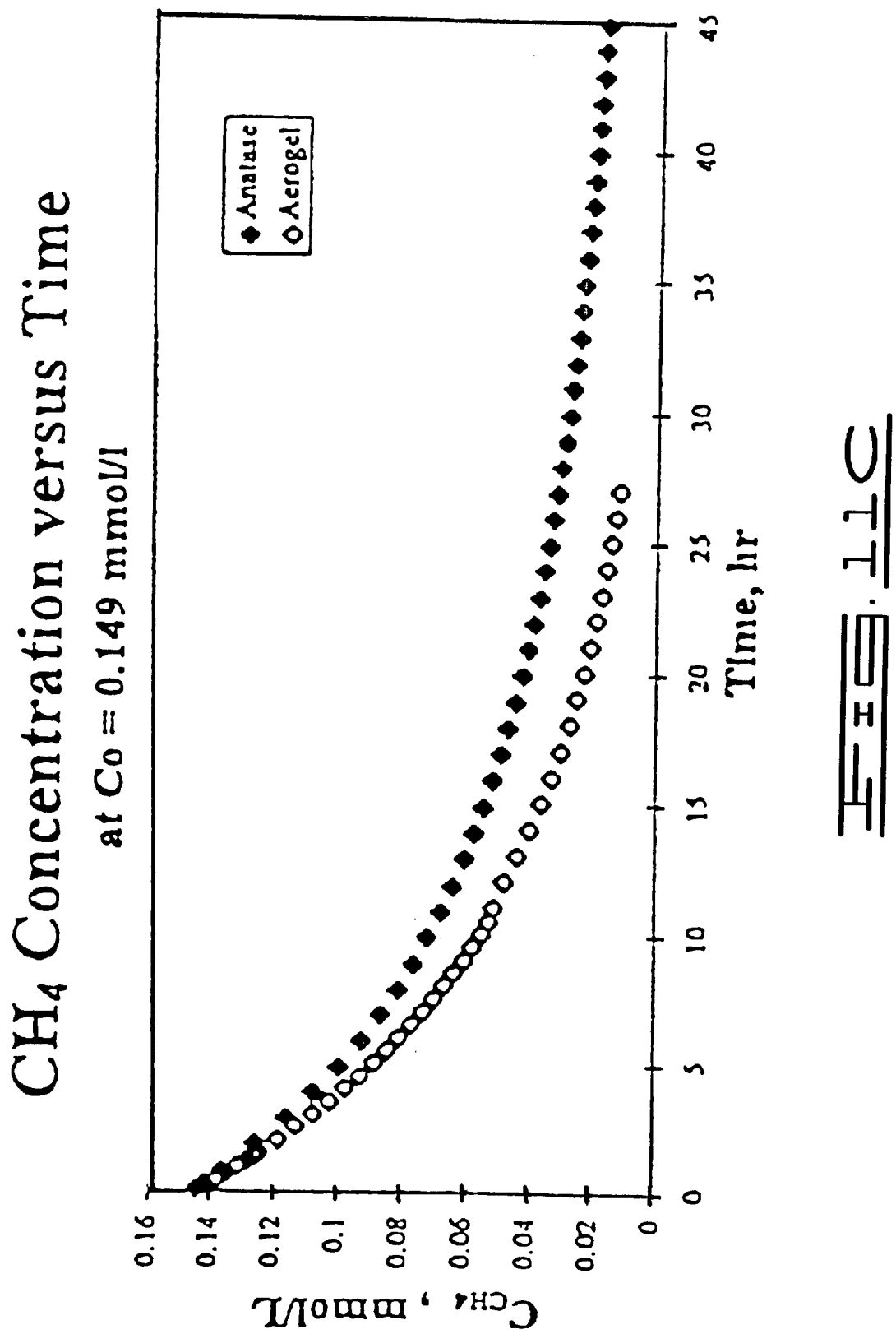
Figure 11D:
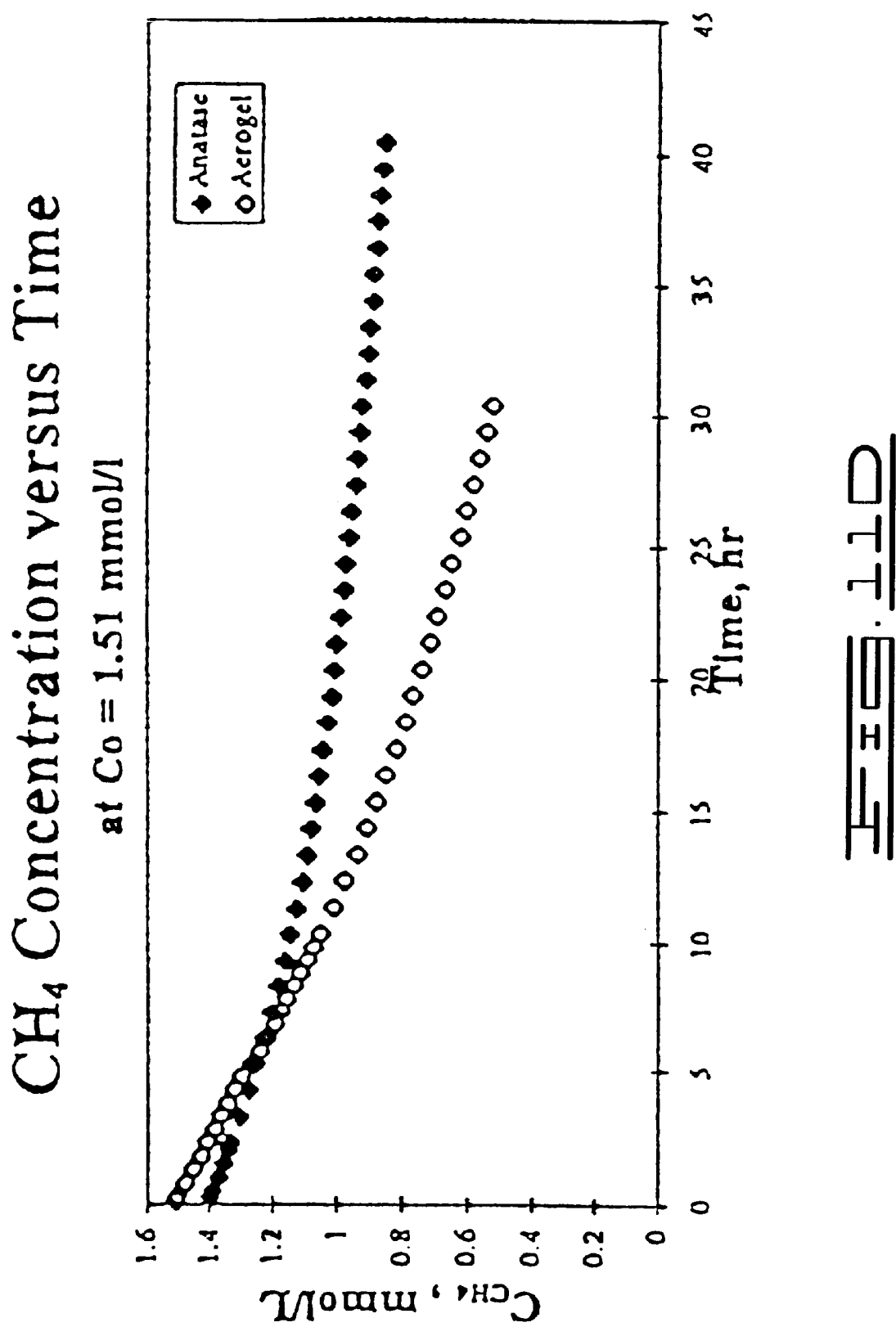
Figure 12A:
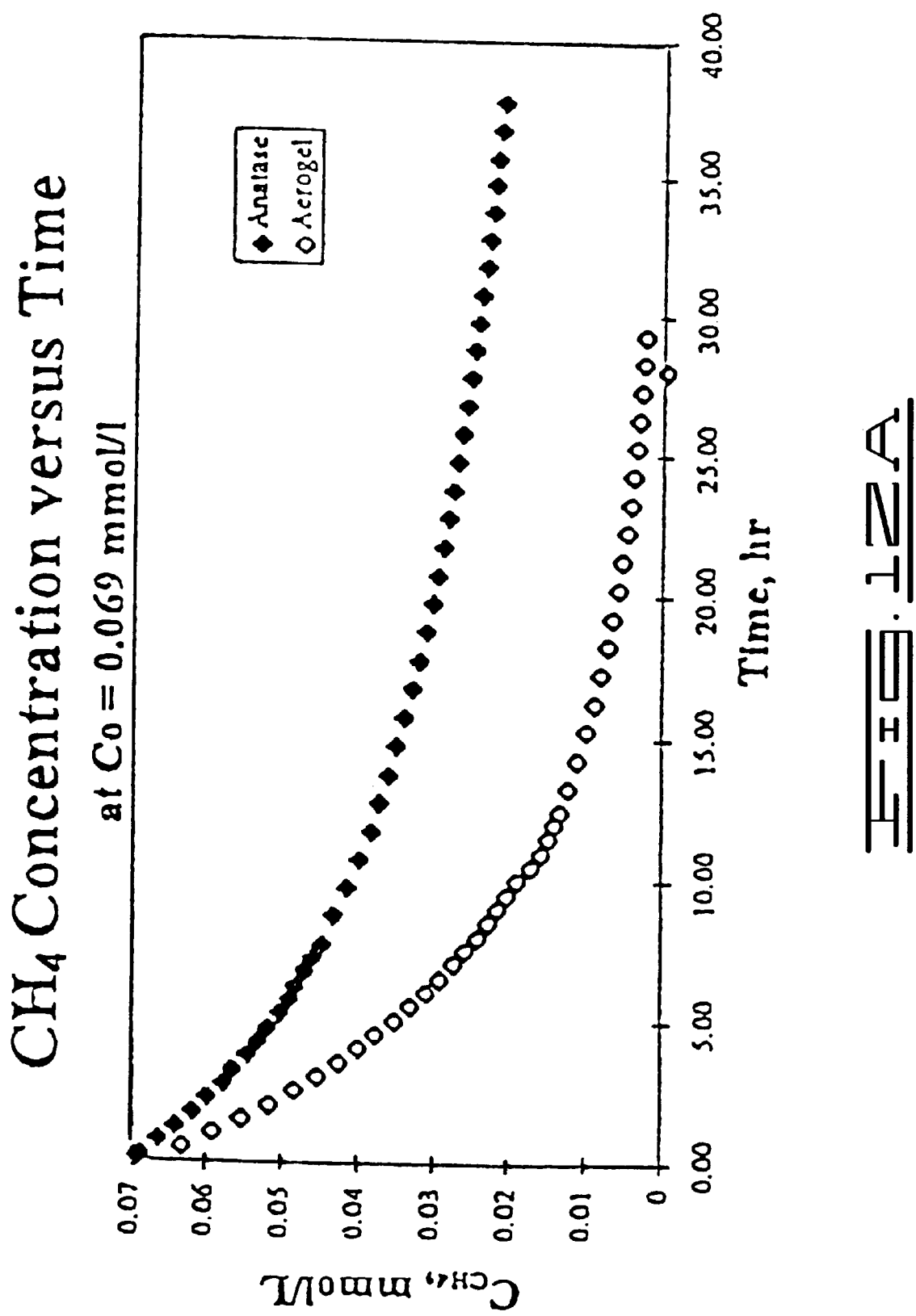
FIGS. 12A–12D are graphical representations comparing the change in reaction rates dependence on time for aerogel and anatase at different inital concentrations.
Figure 12B:
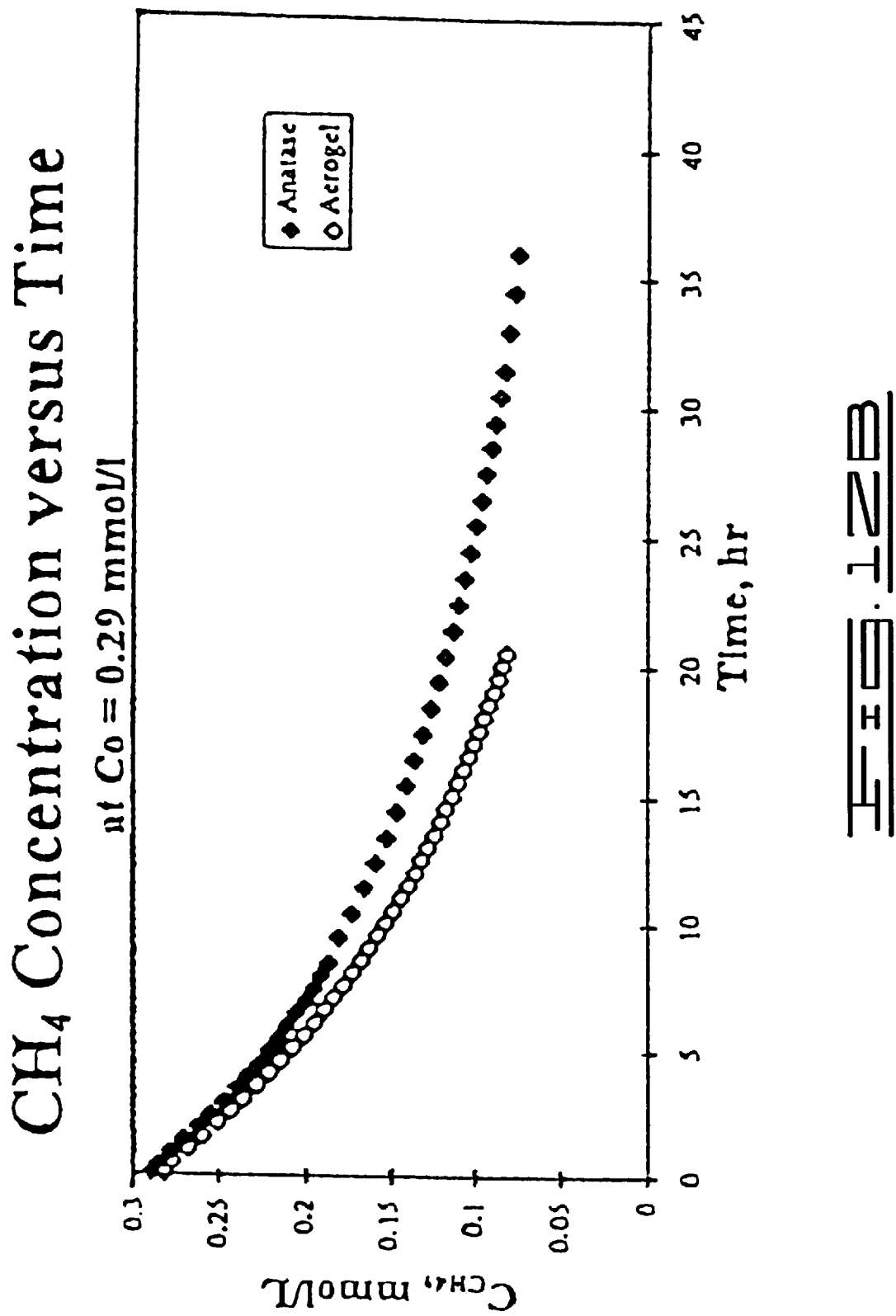
Figure 12C:
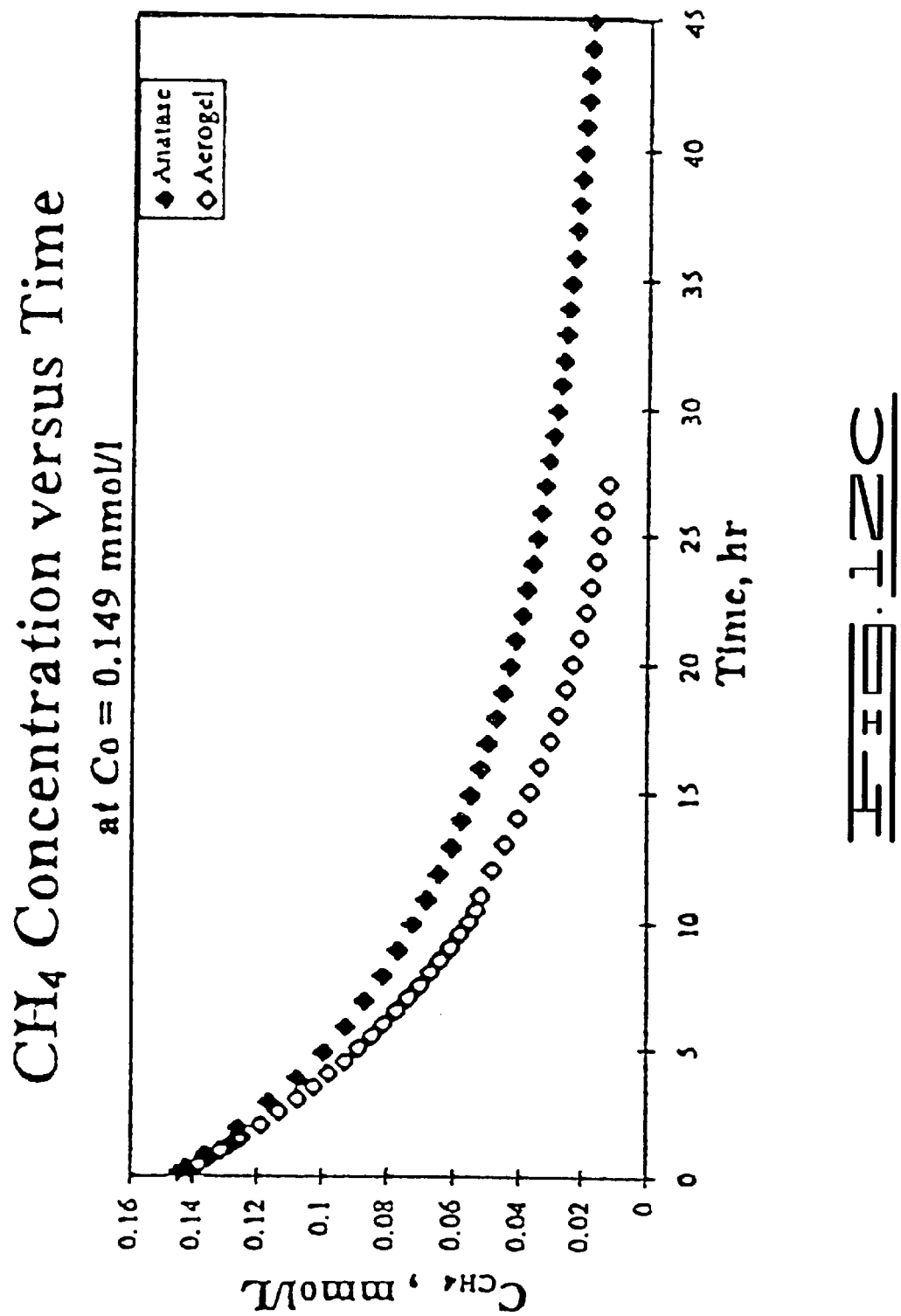
Figure 12D:
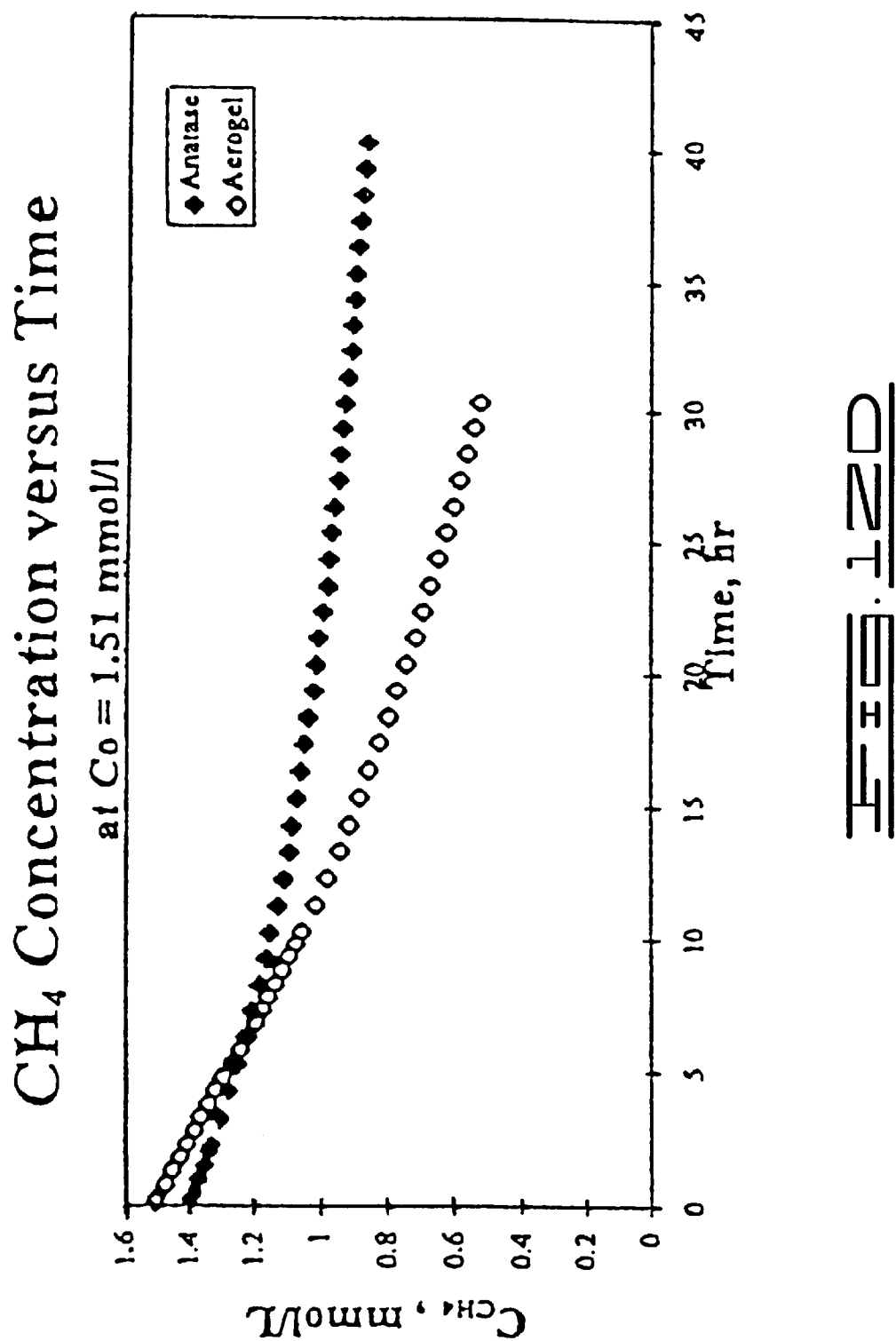
Figure 13A:
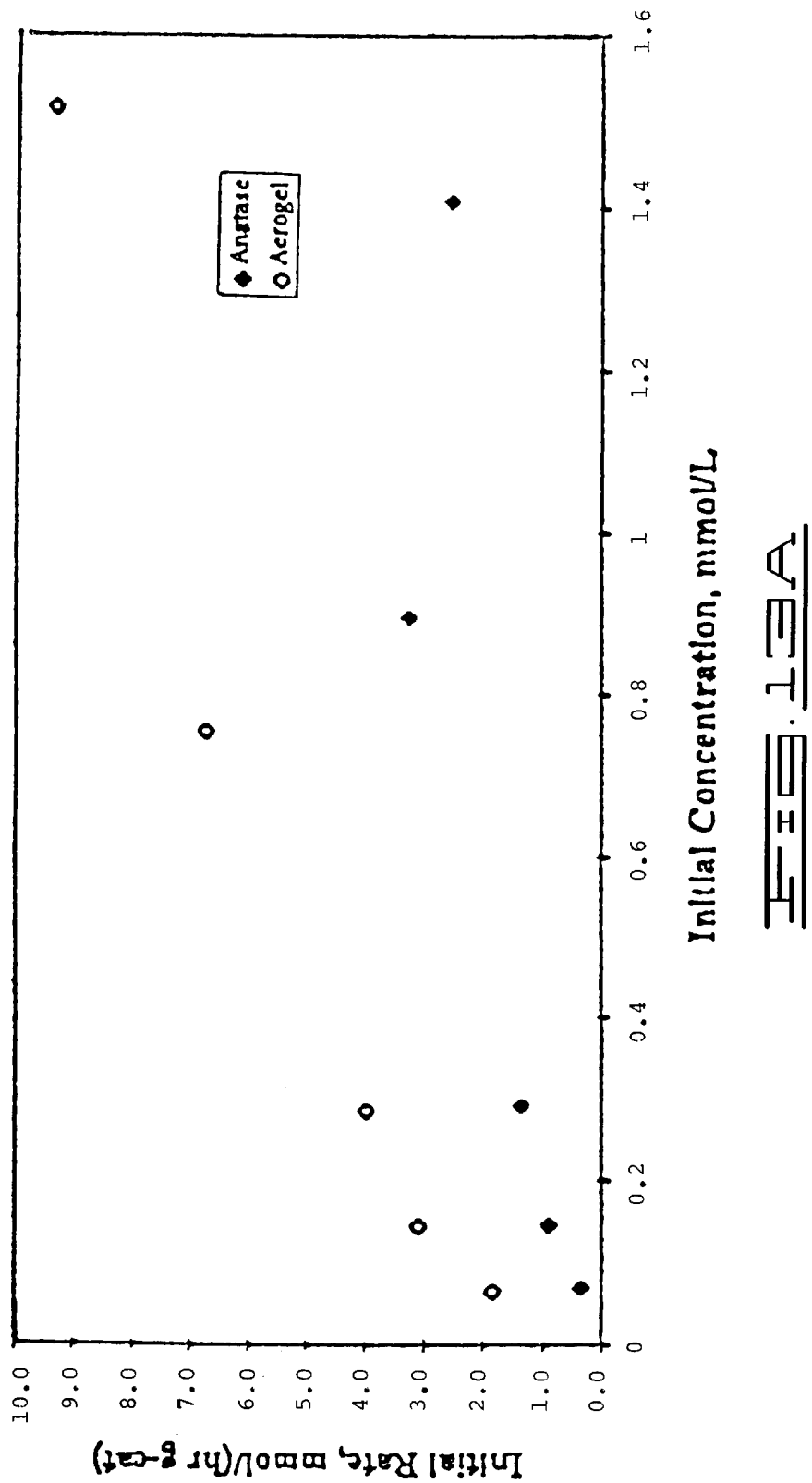
FIGS. 13A–13D are graphical representations comparing the initial rates for methane at different initial concentration based on mass, volume, illuminated area, and available surface area for aerogel and anatase.
Figure 13B:
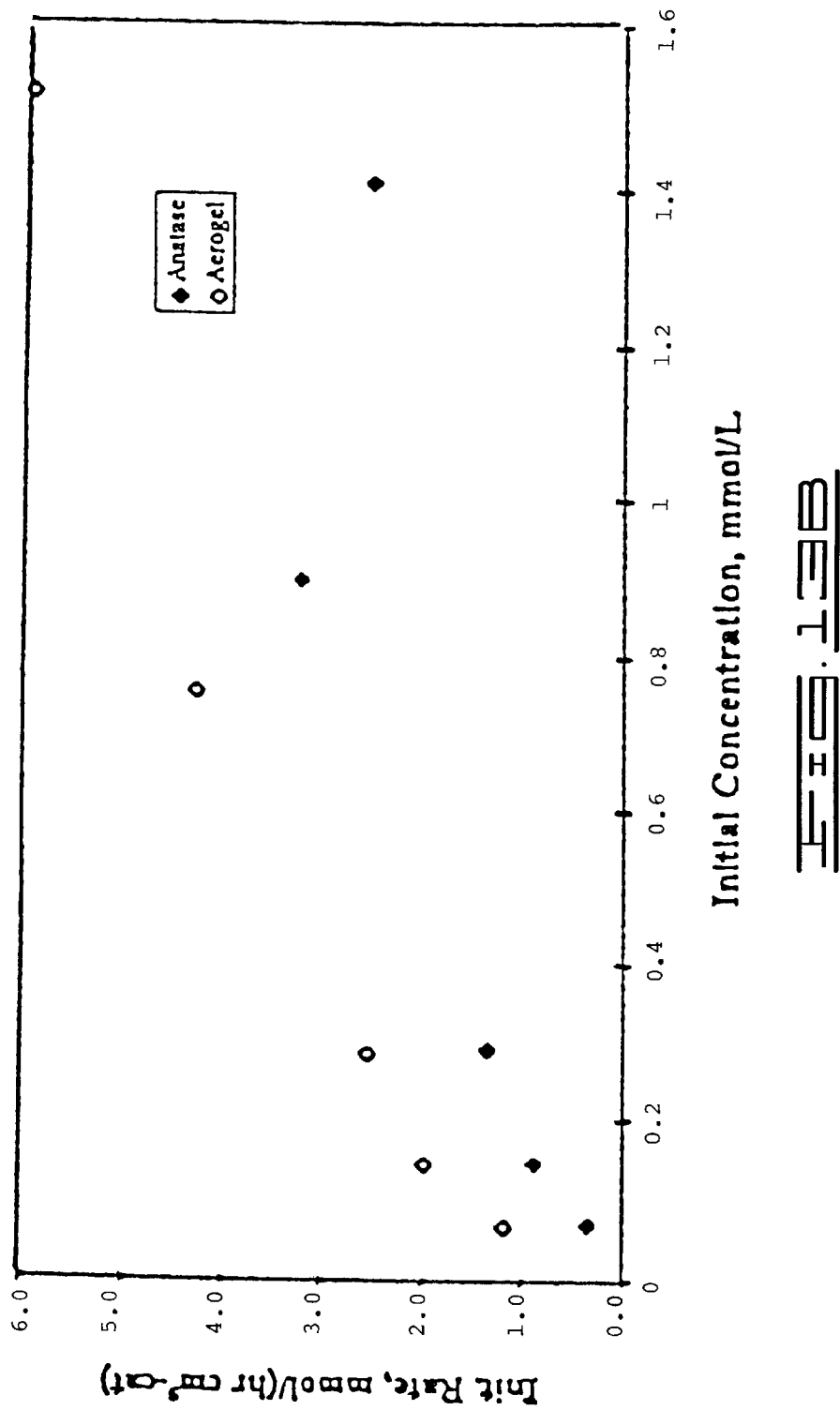
Figure 13C:
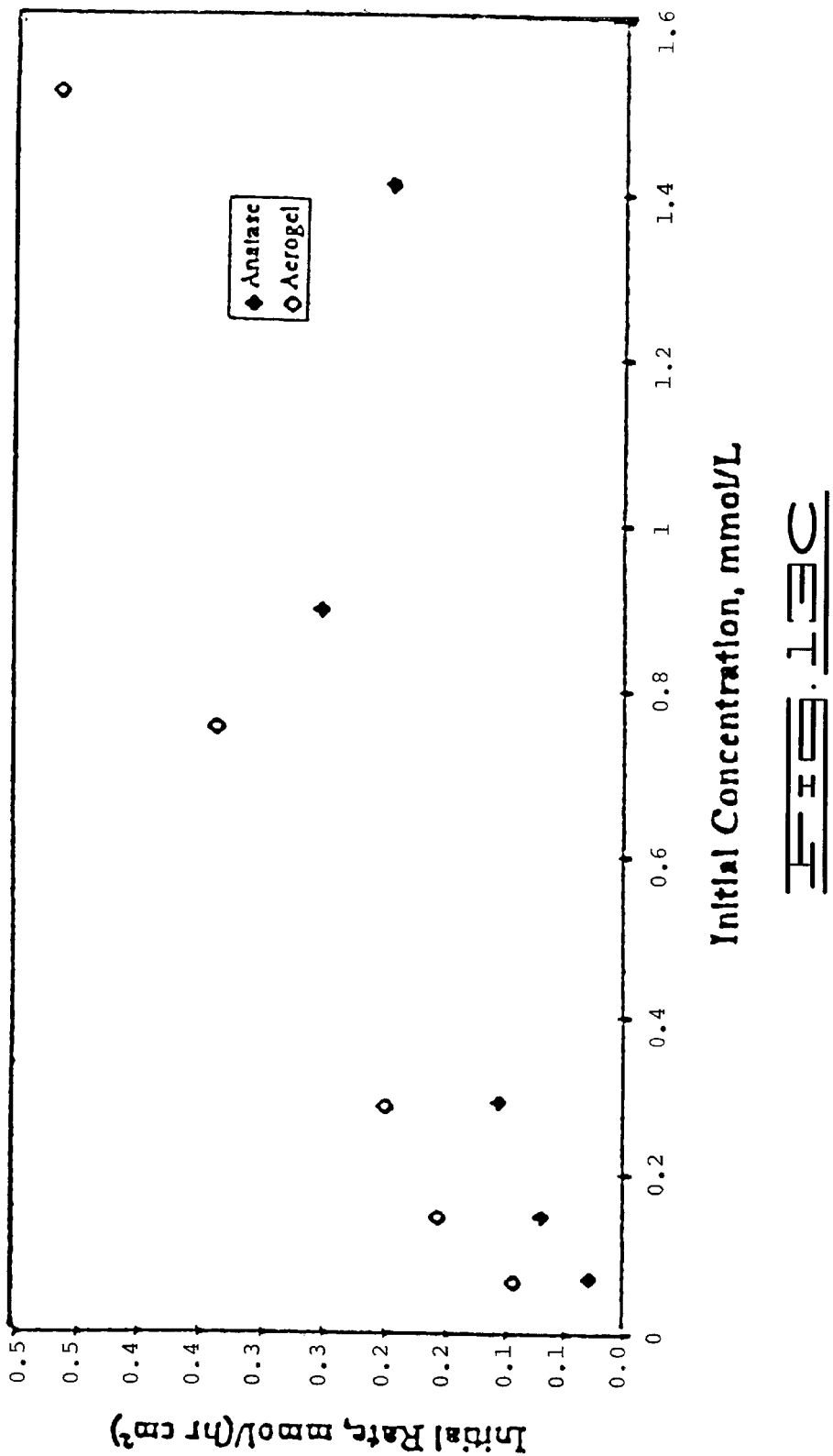
Figure 13D:
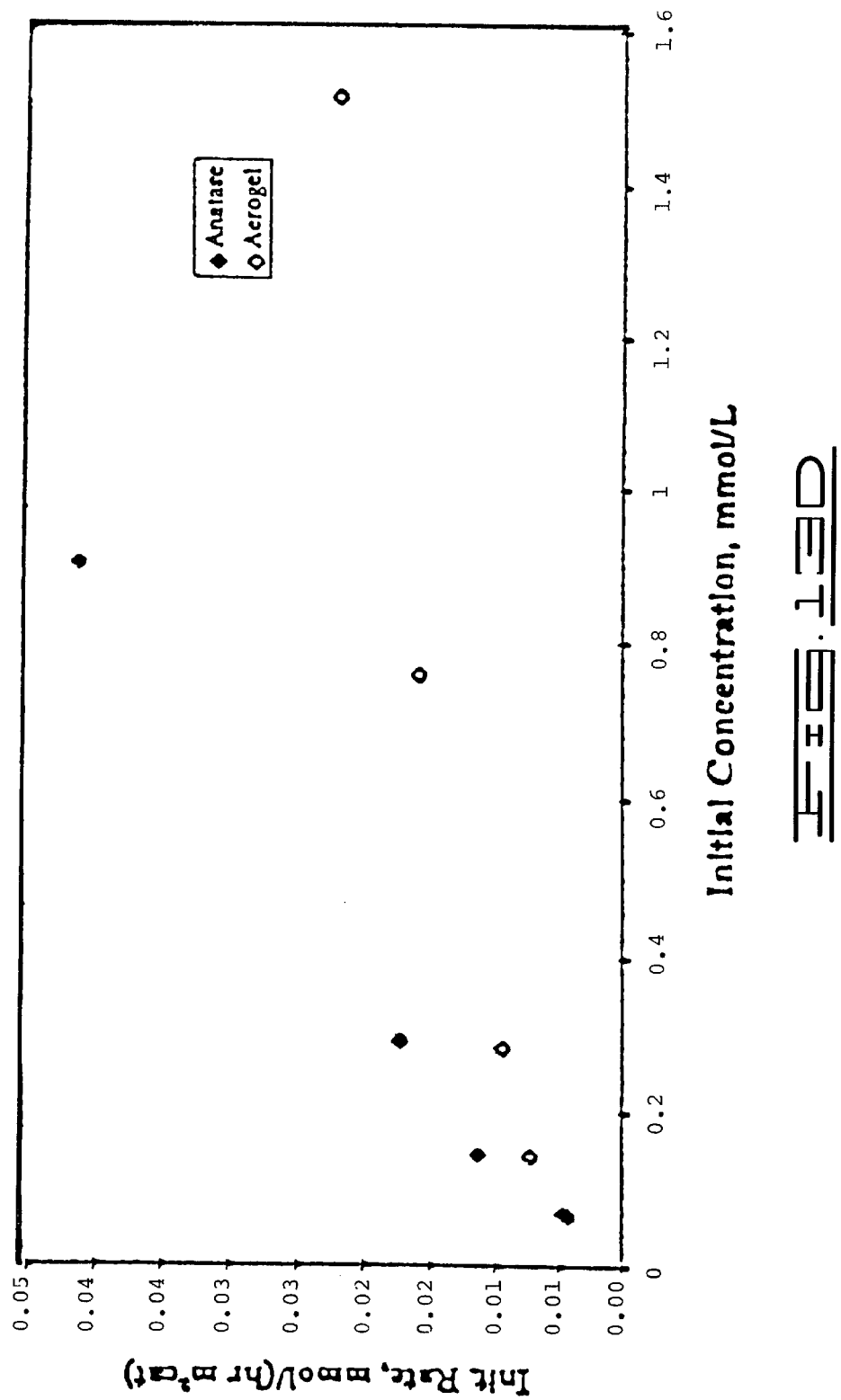
Figure 14A:
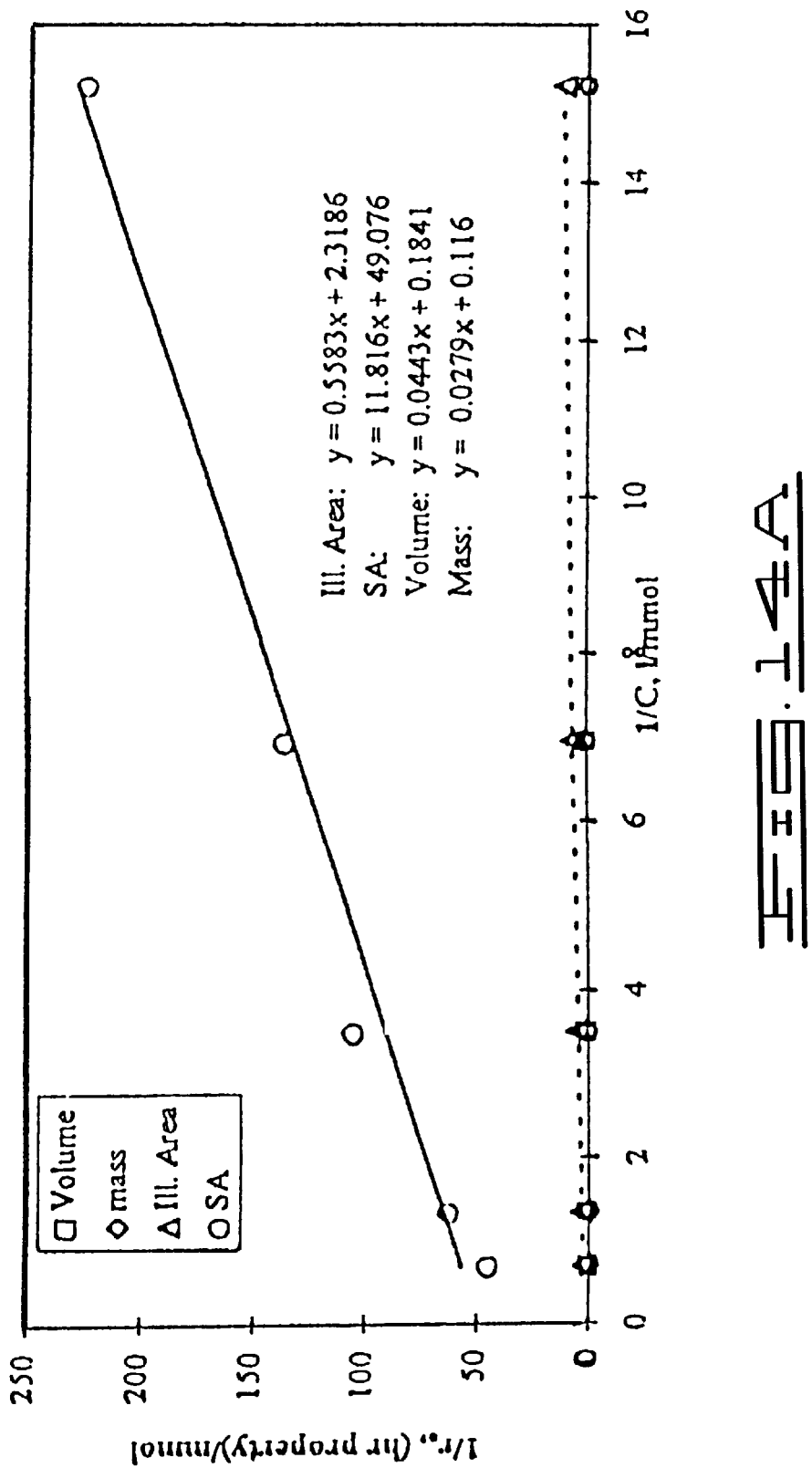

FIGS. 10A and 10B summarize the results for the studies on anatase titanium powder and aerogel. FIG. 10A includes the data for the change in methane concentration with time at different initial concentrations on anatase titanium oxide powder, whereas FIG. 10B summarizes the data for the aerogel. In order to compare the performance of both catalysts the change in concentration with time for both catalysts was plotted for each individual concentration in FIGS. 11A–11D. This shows clearly that the gas phase methane concentration decreases much faster on the aerogel catalyst than on the anatase powder. Also, at the end of the experimental run, the value at which the methane concentration does not decrease significantly is much lower (up to 50%) for the aerogel catalyst. Note that at the end of the run the methane concentration is still decreasing, but slowly due to its low surface concentration. The dependence of the reaction rates on time are shown in FIGS. 12A–12D. At all concentrations the initial rate on aerogel is higher than that of anatase. Because methane adsorption is so low, the rates were simply calculated by the ratio of change in methane gas phase concentration over change in time:

$$-r = \frac{\Delta C}{\Delta t} \quad [6]$$

Moreover, it should be noted that the aerogel bed volume is only about two thirds that of the anatase powder. Despite lower volume and lower mass of the aerogel bed (1.33 g aerogel, 3.76 g anatase) the performance of the titanium dioxide aerogel exceeds that of the anatase titanium dioxide powder.

In order to evaluate reaction rate constants, initial rate data were determined based on mass, volume, illuminated area and total surface area of the catalyst bed. The Langmuir Hinshelwood rate expression was applied by assuming that only methane adsorbs on the catalyst surface.

$$r = \frac{kK_C C_C}{1 + K_C C_C + K_W C_W} \quad [7]$$

where
k=Rate constant
$K_c$=Adsorption constant for contaminant
$K_w$=Adsorption constant for water
$C_c$=Concentration of contaminant
$C_w$=Concentration of water The water adsorption term in the denominator can be eliminated since no water is present at the beginning of the run. Hence, expression [7] for methane as contaminants becomes $$r = \frac{kK_m C_m}{1 + K_m C_m} \quad [8]$$

where
$K_m$=Adsorption constant for methane
$C_m$=Concentration of methane
The initial rate data are summarized in Table III.

TABLE III

INITIAL REACTION RATES PER UNIT MASS, VOLUME, ILLUMINATED AREA AND TOTAL AVAILABLE SURFACE AREA OF CATALYSTS ANATASE AND AEROGEL

| | Initial gas phase concentration mmol/L | Initial Rate | | | |
|---|---|---|---|---|---|
| | | per unit cat. mass mmol hr g-cat | per unit cat. volume mmol hr cm³-cat | per unit illumin. area mmol hr cm²-ill. | per unit cat. surface area mmol hr m²-cat |
| ANATASE | 0.06987 | 0.38478 | 0.37379 | 0.02967 | 0.00481 |
| | 0.14591 | 0.91489 | 0.88875 | 0.07055 | 0.01144 |
| | 0.29145 | 1.38877 | 1.34909 | 0.10709 | 0.01736 |
| | 0.89571 | 3.29837 | 3.20413 | 0.25435 | 0.04123 |
| | 1.40745 | 2.56865 | 2.49526 | 0.19808 | 0.03211 |
| AEROGEL | 0.06564 | 1.88193 | 1.18624 | 0.09417 | 0.00445 |
| | 0.14400 | 3.13836 | 1.97821 | 0.15704 | 0.00742 |
| | 0.28394 | 4.01841 | 2.53293 | 0.20107 | 0.00950 |
| | 0.75381 | 6.76080 | 4.26155 | 0.33829 | 0.01598 |
| | 1.50987 | 9.35851 | 5.89897 | 0.46828 | 0.02212 |

FIGS. 13A–13D illustrate that the initial rate for aerogel based on mass, volume, and illuminated area is two to three times higher than that of anatase. On the basis of the total catalyst surface area the anatase demonstrates a better performance. This implies that the actual reaction site of the anatase has a higher activity than the site of the aerogel. This is expected since the synthesized aerogel has a very low crystallinity. There lies a potential of greatly improving the performance of aerogel by increasing its crystallinity.

By rearranging the equation of [8] to $$\frac{1}{r} = \frac{1}{kK_m}\frac{1}{C_m} + \frac{1}{k} \quad [9]$$

the rate constants based on mass, volume, illuminated area, and surface area can be determined from the slope and intercept of the plot of 1/r versus $1/C_m$, where $$\text{Intercept} = \frac{1}{k}$$

$$\text{Slope} = \frac{1}{kK_m}$$

The plots and resulting parameters k and $K_m$ are summarized The rate constants for the anatase powder are higher except for the one based on the mass of catalyst. The adsorption constant $K_m$ is larger for the aerogel which is apparently responsible for its faster oxidation rate of methane.

Acetone

Experiments with acetone as the contaminant were performed similar to those described for methane. However, in order to observe how much the adsorption has an effect on the actual gas concentration, the initial set-up was performed as follows. The two valves before and after the catalytic cell were completely closed and the cell-bypass valve completely opened (see FIG. 1). A predetermined amount of acetone was injected into the system and allowed to circulate and mix in the reactor loop without being exposed to the catalyst. The two valves disconnecting the reactor cell from the system were then opened and the acetone gas mixture circulated across the catalyst.

Due to the very high adsorption of acetone on the catalyst, the experiments were performed at much higher injected amounts of acetone than for methane for better gas phase measurability.

Figure 15A:
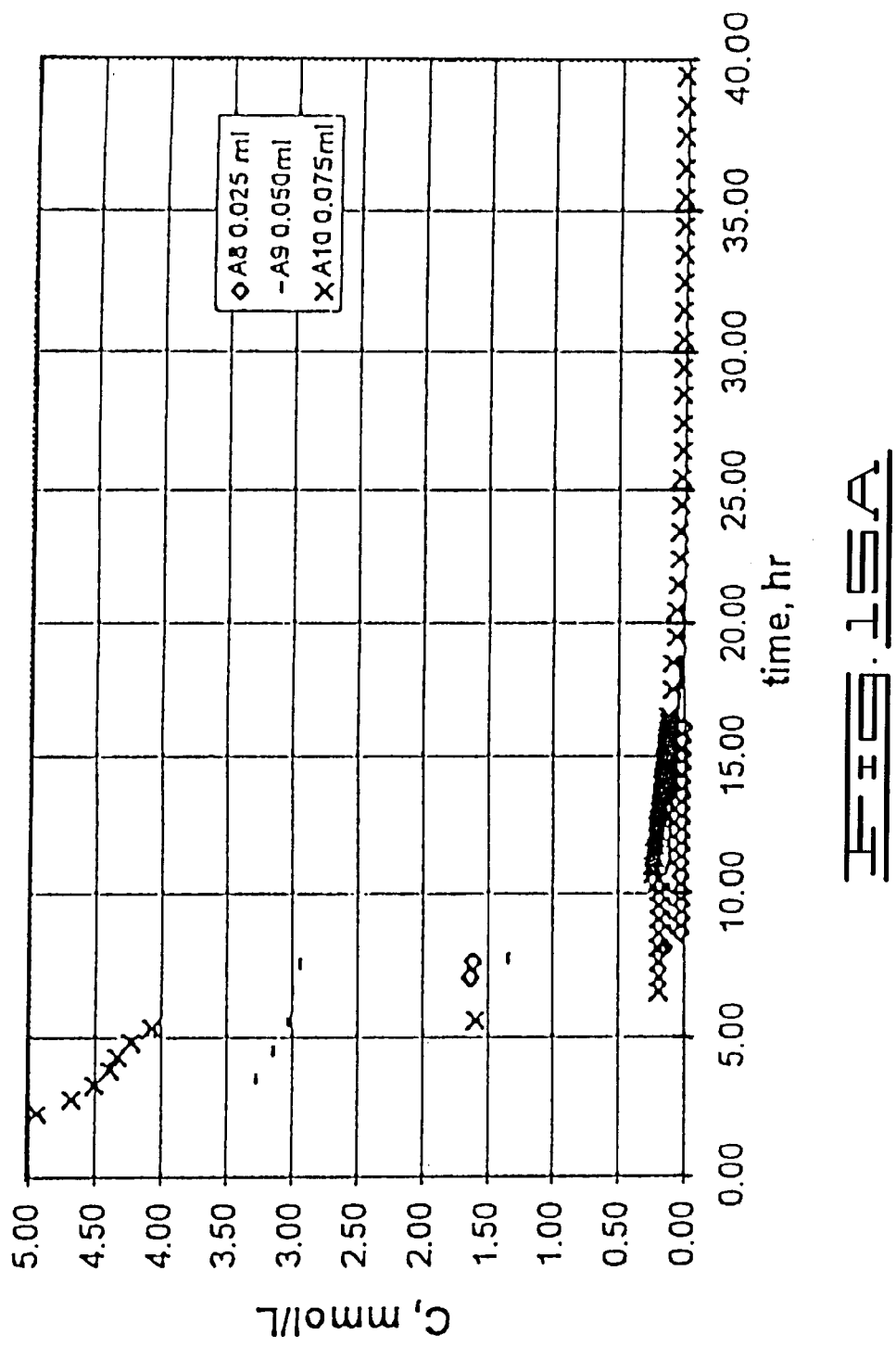
FIGS. 15A–15B are graphical representations showing the change in acetone gas phase concentration with aerogel and anatase catalysts at different initial acetone concentrations.
Figure 15B:
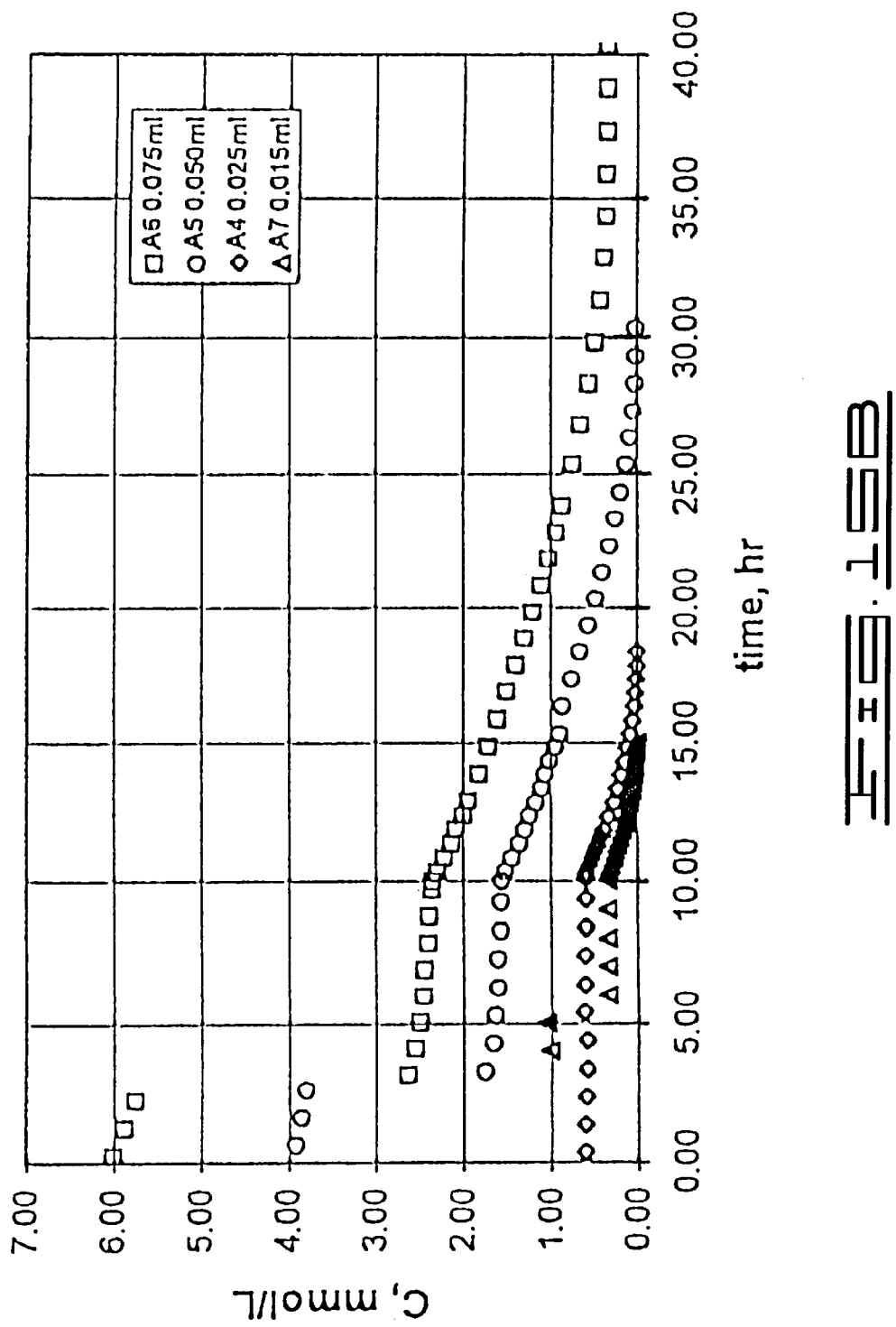
Figure 15A:
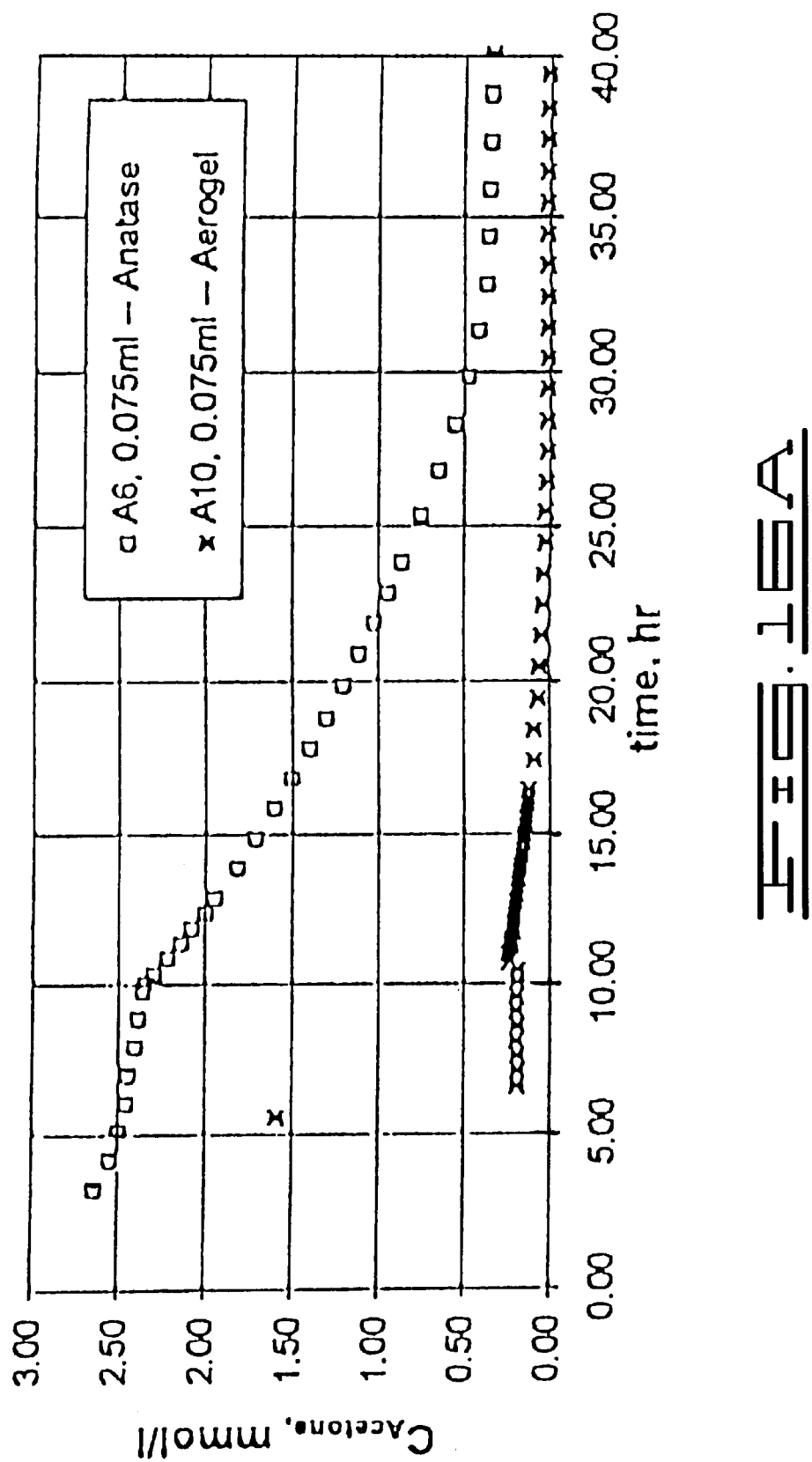
Figure 15B:
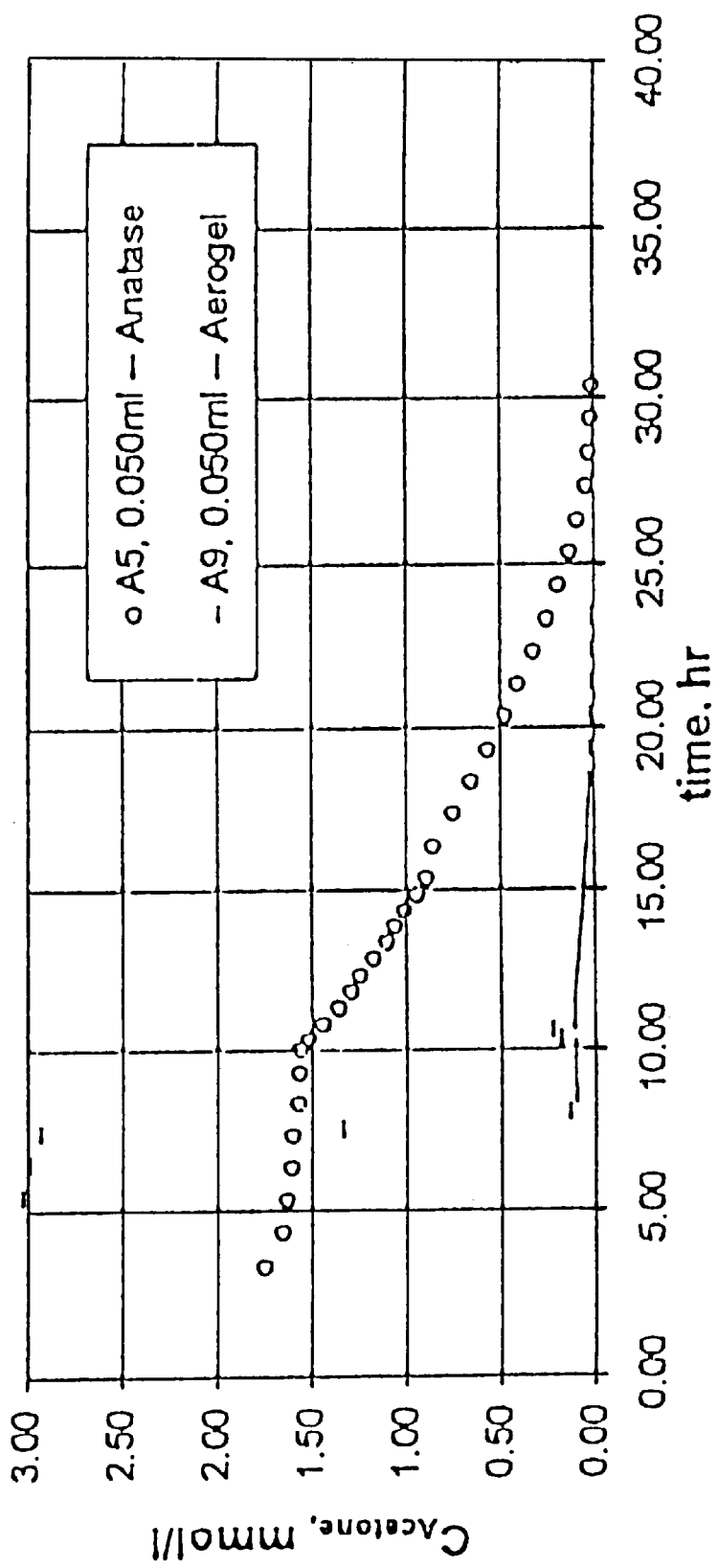
Figure 15C:
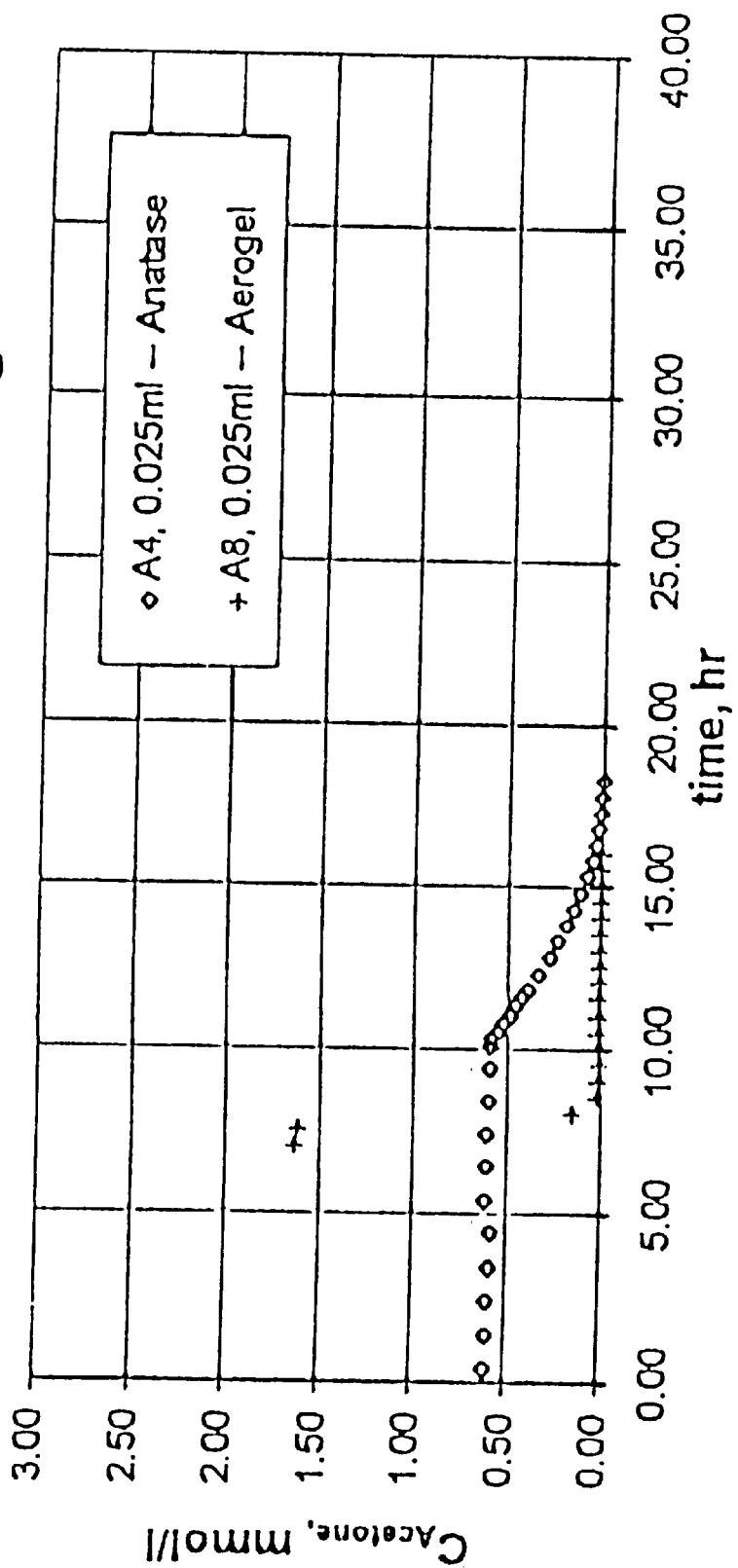

Four experimental runs at lower concentrations were conducted with an initial desired acetone gas concentration ranging from 0.5 to 3 mmol/L by injecting 0.015, 0.025, 0.050, and 0.075 ml of liquid acetone into the reactor system of about 300 ml volume. However, as already shown in FIG. 7, due to acetone adsorption on the catalyst the actual gas concentration dropped by about 30–40% for the anatase and by up to 90% for the aerogel. Because of the strong adsorption of aerogel, the acetone gas phase concentration at 0.015 ml injection was only measurable for two hours after the beginning of the reaction. FIGS. 15A and 15B summarize the experimental runs on aerogel and anatase by plotting acetone concentrations versus time. The sharp drop in concentration shown in these two graphs, e.g., at t=5 hours for run A10 on the aerogel catalyst corresponds to the mixing in the additional reactor volume and adsorption on the catalyst upon opening the valves to the catalytic cell. In FIG. 15A, only three experimental runs are summarized. The gas phase concentration upon injection of 0.015 ml acetone was too low to collect sufficient number of data.

FIGS. 16A–16C compare the performances of aerogel and anatase catalysts by plotting the acetone gas phase concentration versus time after mixing and adsorption have occurred. At time t=10 hours, the UV light was switched on to initiate the photocatalytic reaction. The gas phase concentration of acetone in the aerogel catalyst system is very low already due to the high adsorption. This demonstrates that the aerogel acts as an excellent adsorbent which immediately removes a high percentage of the contaminant from the air stream. As a result, the time required to eliminate the remaining acetone from the gas phase is shorter than for the anatase powder, but in both cases the acetone concentration eventually decreases to zero.

Figure 17A:
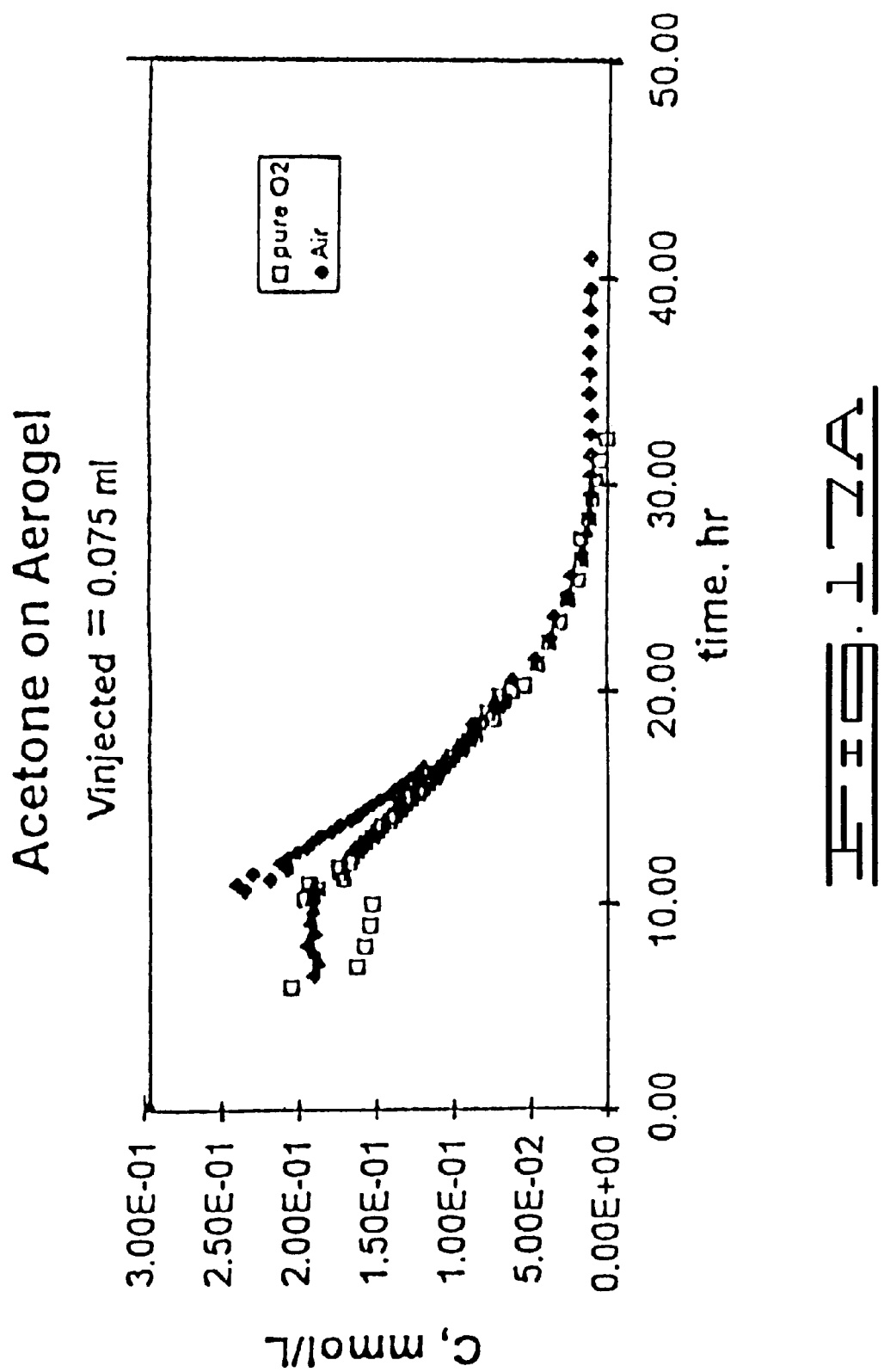
FIGS. 17A–17C are graphical representations showing change of acetone gas phase concentration with time for aerogel with initial feed of air and pure oxygen.
Figure 17B:
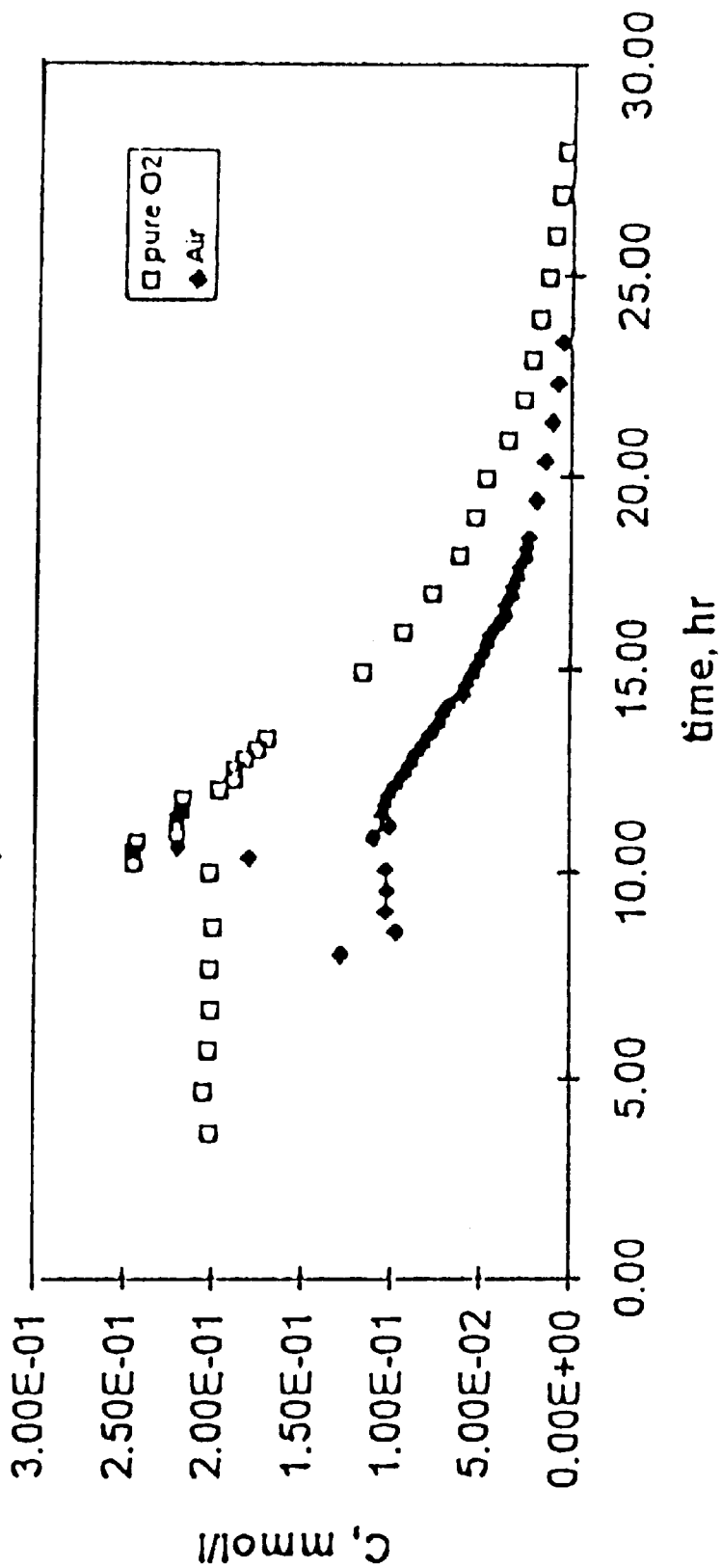
Figure 17C:
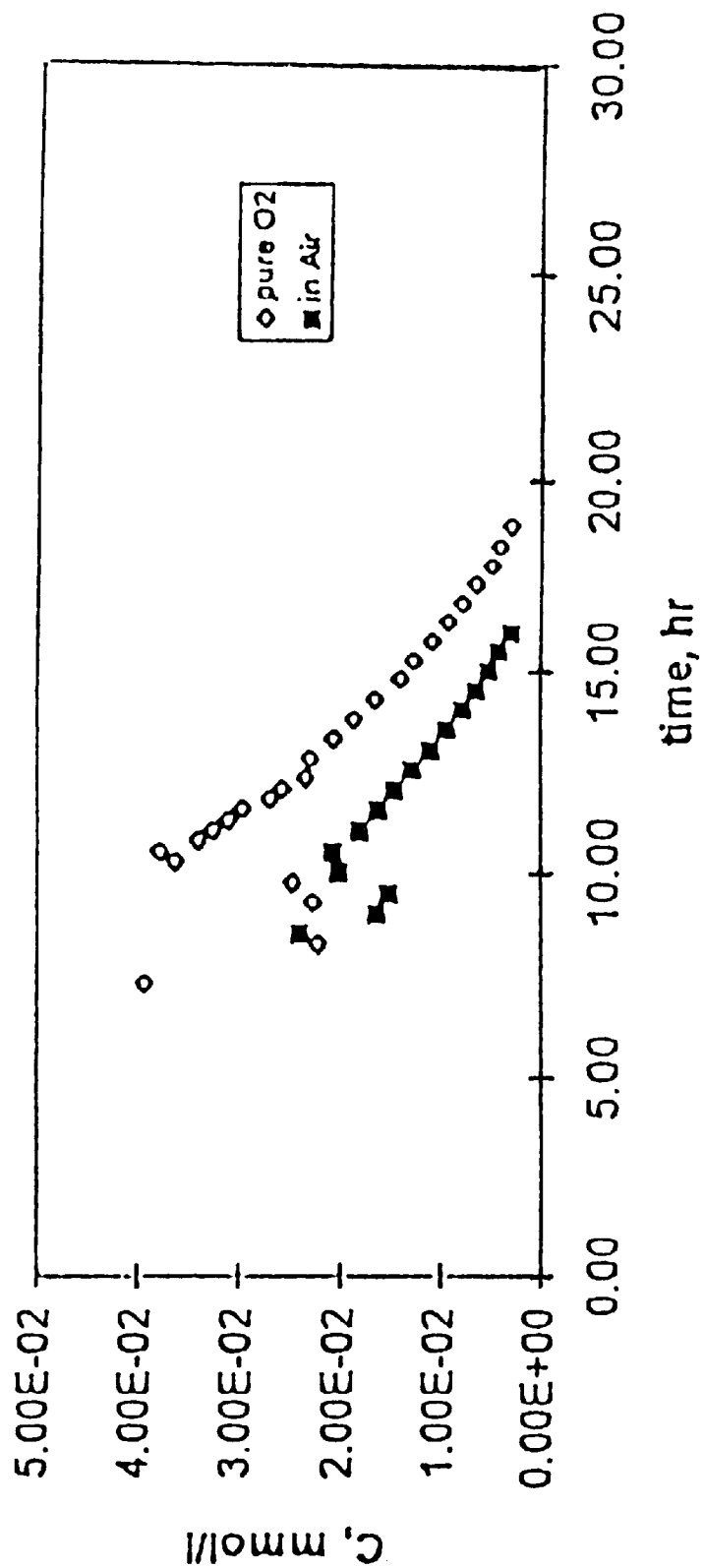

The data in FIG. 17A–17C show two interesting features. First, when the UV light is switched on at t=10 hours, the gas phase acetone concentration sharply increases before decreasing. The increase is particularly noticeable in FIG. 17A, i.e., with 0.075 ml of injected acetone. The concentration increase is due to the small but rapid warming of the aerogel catalyst by the UV light, causing desorption of some of the absorbed acetone. The decrease, of course, is due to the rapid photocatalytic oxidation. The second interesting feature is that in the case of the largest initial concentration of acetone (FIG. 17A) the acetone concentration does not decrease to zero but levels out at a low but unchanging value. The same phenomenon occurred with the anatase catalyst under same conditions (see FIG. 16A). Calculations showed that 0.075 ml of acetone requires more oxygen for complete oxidation than is available in the reactor system. Thus, the point at which the acetone concentration is unchanging corresponds to the depletion of all available oxygen. By using pure oxygen instead of air in the system, we confirmed that even these high initial concentrations of acetone could be removed by photocatalytic oxidation (FIG. 17A). The depletion of oxygen also corresponded with an increase in the concentration of partial oxidation products in the system.

Partial oxidation products were observed at very low concentrations by gas chromatography, mass spectrometry, and infrared spectroscopy. Other researchers have not noted the appearance of acetone partial oxidation products, but that may be due to the larger reactor residence times typically used in other experiments. (The possibility of partial oxidation products was one of the reasons methane was used as a contaminant, since methane is more difficult to oxidize than most hydrocarbons. That methane would be completely oxidized is evidence of the strong oxidizing potential of the aerogel system). At the very low concentrations observed, identification of partial oxidation products is difficult and is still tentative.

Figure 18A:
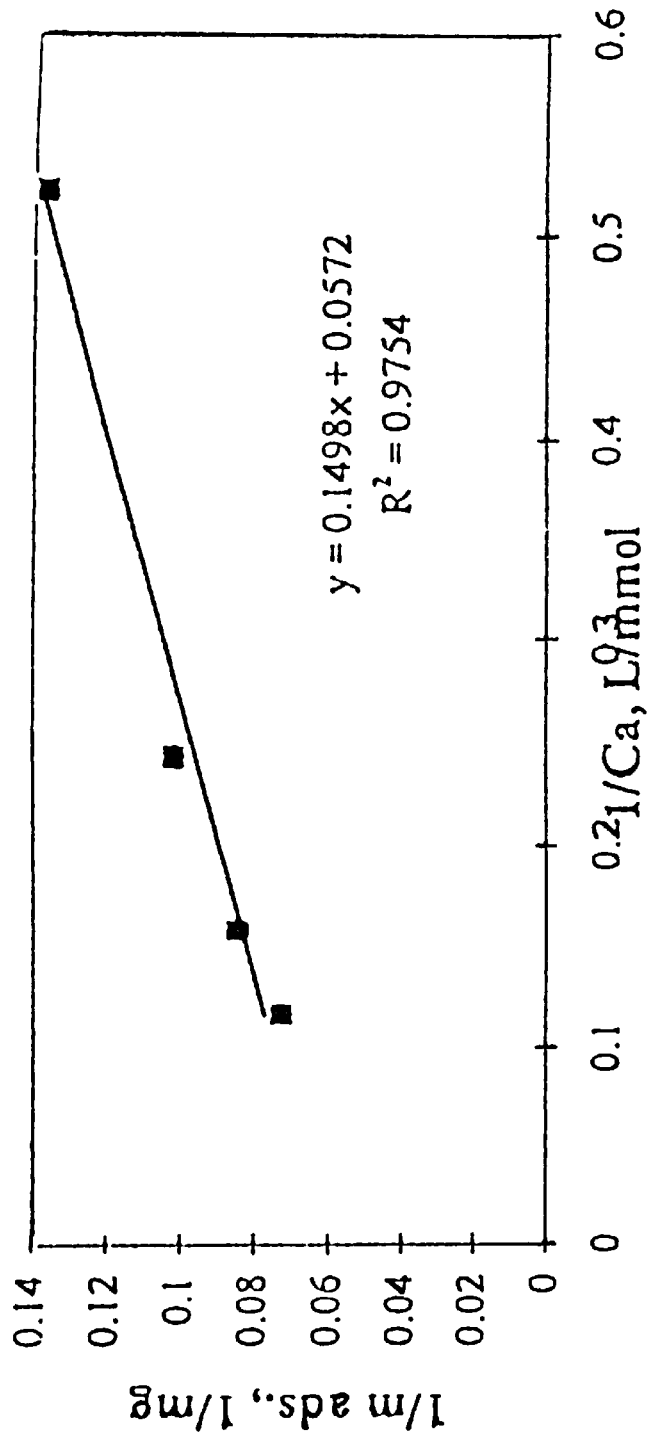
FIGS. 18A–18B are graphs for determining the acetone adsorption constants for anatase and aerogel.
Figure 18B:
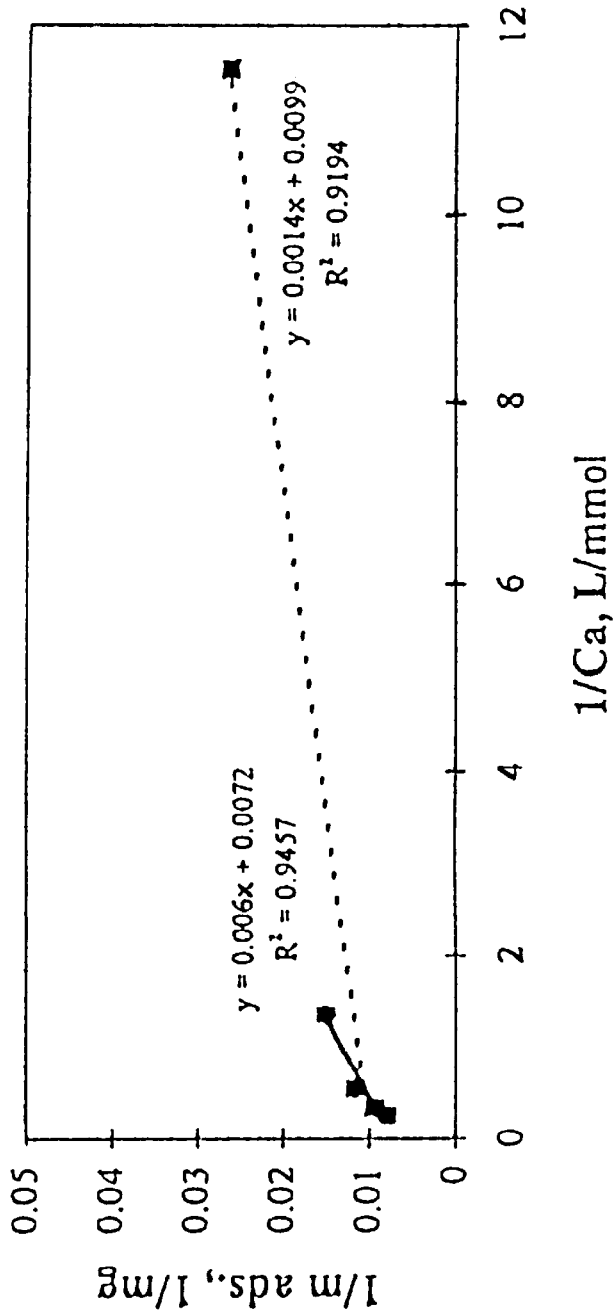

The evaluation of reaction rate constants was based on the method described in a paper by Sauer and Ollis[4]. First, the adsorption equilibrium constants for acetone were determined. This was done by linear plots based on a Langmuir equation assuming no water is present:

$$\Theta = \frac{m_a^{ads.}}{\mu_a^{monol.}} = \frac{K_a C_a}{1 + K_a C_a} \quad [10]$$

where $m_a^{ads,}$ = amount of acetone adsorbed
$m_a^{monol}$ = amount of acetone in a monolayer
$K^a$ = adsorption constant of acetone
$C^a$ = concentration of acetone in gas phase
$\Theta$ = Fraction of surface covered with acetone The results for anatase and aerogel are summarized in FIGS. 18A–18B. The reaction rate of acetone, $r_a$, is the sum of the concentration change in the gas phase and change of concentration of acetone adsorbed on the catalyst, or:

$$r_a V_{cat} = V_{sys} \frac{dC_a}{dt} + \frac{dm_a^{ads.}}{dt} \quad [11]$$

where $V_{cat}$=catalyst volume
$V_{sys}$=system volume.

Taking into account that the rate without significant adsorption is $$r_a = \frac{kKC_a}{1 + KC_a} = \frac{V_{sys}}{V_{cat}} \frac{dC_a}{dt} \quad [12]$$

we can substitute $ma_{ads}$ from [10] and $r_a$ from [12] into [11] to get after rearranging $$-\frac{kKC_a}{1 + KC_a} = d\left(V_{sys}C_a + \frac{\mu_a K_a C_a}{1 + K_a C_a}\right)\bigg/dt \quad [13]$$

If one defines $$\Psi = V_{sys}C_a + \frac{\mu_a K_a C_a}{1 + K_a C_a} \quad [14]$$

as the total mass of acetone in the system equation [13] can be arranged to give $$-\frac{1}{d\Psi/dt} = \frac{1}{kKV_{cat}C_a} + \frac{1}{kV_{cat}} \quad [15]$$

$$-\frac{1}{d\Psi/dt} \text{ versus } \frac{1}{C_a}$$

$$\text{slope} = \frac{1}{kKV_{cat}} \text{ and} \quad [16]$$

$$\text{intercept} = \frac{1}{kV_{cat}}. \quad [17]$$

Figure 19A:
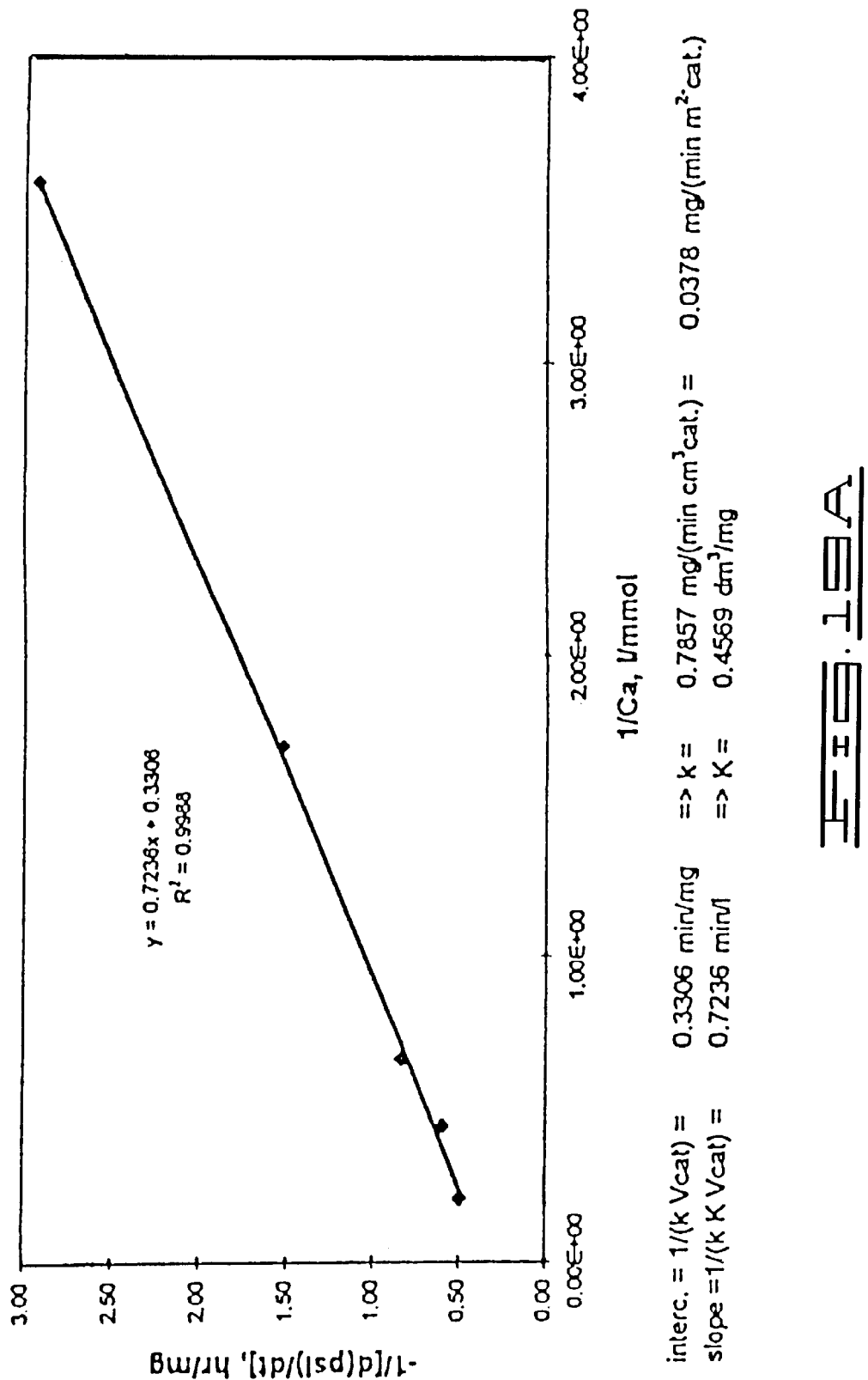
FIGS. 19A–19B are graphs for determining the initial rate parameter for anatase powder and aerogel.
Figure 19B:
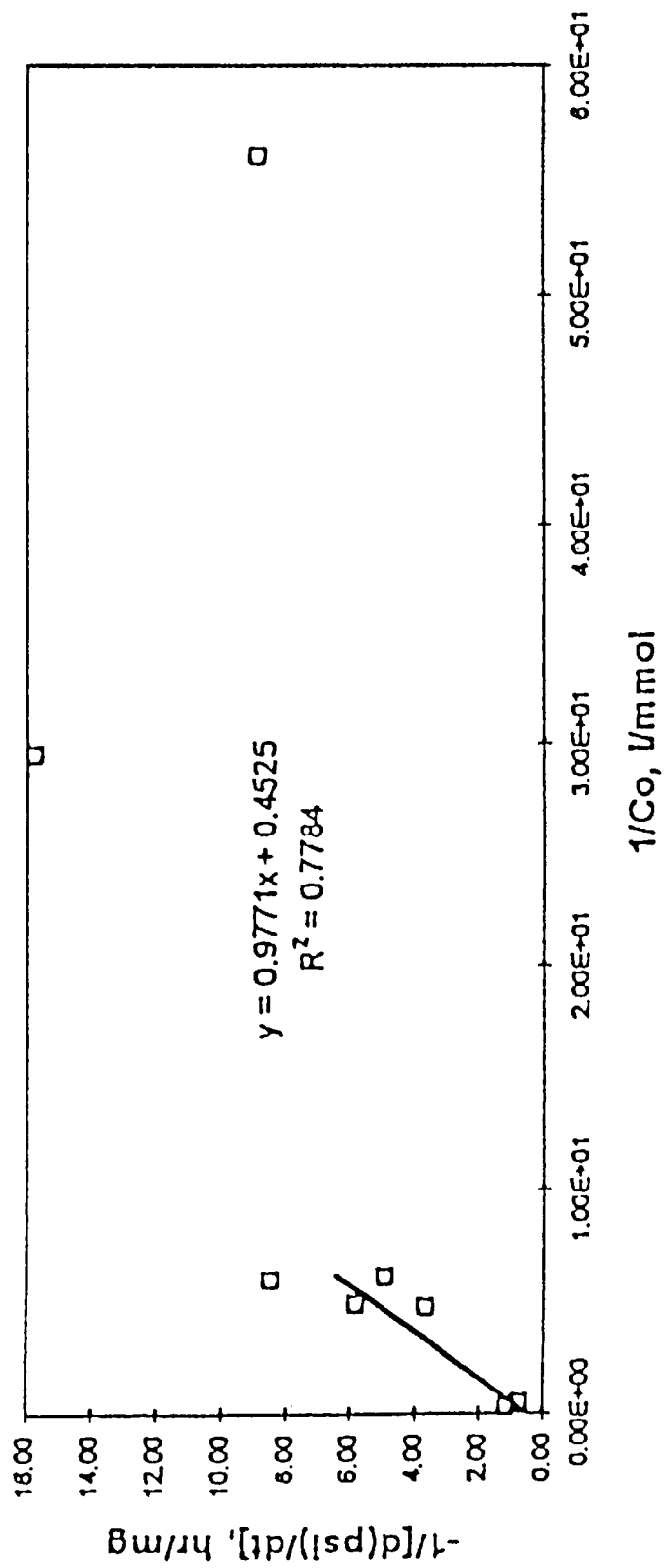

FIGS. 19A–19B give the results of this plot for anatase and aerogel, respectively. The data for anatase powder give a linear plot with $R^2=0.9988$. The reaction constant was found to be $k^{anatase}=0.786$ mg/(min cm$^3$-cat). However, as shown in FIG. 19B the data for the aerogel are quite scattered. For this purpose, the data at low concentrations (0.025 ml acetone injected) which contributed mainly to the large scattering were eliminated for the determination of $m_a$ and k to give an estimate of the reaction rate constant. This resulted in a rate constant value of $k_{aerogel}=1.0475$ mg/(min cm$^3$-cat). This value is about 30% higher than that of the anatase. However, it should be noted that the data of aerogel have a high uncertainty due to the data scatter. Also, these data are on a reactor volume basis. On a surface area basis, the $k^{anatase}$ is much larger than $k^{aerogel}$, again indicative of the higher intrinsic activity of the crystalline anatase versus the noncrystalline aerogel.

CONCLUSIONS

The titania aerogel photocatalyst shows remarkable promise for complete oxidation processes. The aerogel successfully catalyzed the complete oxidation of acetone as well as methane, a very stable hydrocarbon. On either a catalyst mass, catalyst volume, or illuminated external surface area basis, the aerogel significantly outperformed a 99.9% anatase titania powder. This superior performance is despite the very low crystallinity of the aerogel (only crystalline $TiO_2$ exhibits the necessary band gap properties for photoactivity, with the anatase form much more active than the rutile form of titania). That the low-crystallinity aerogel performed so well has significance both for ease of utilization of the aerogel and for improvements in photocatalytic activity.

One of the challenges in development of a photocatalytic reactor is ensuring that a high fraction of the catalyst surface area is accessible to UV light. UV light penetrates only a few microns into titania, thus layers of titania powder must be spread very thin over a non-catalytic support (e.g., a monolith) or titania powder must be continuously stirred or mixed such that particles are periodically exposed to UV light (e.g., in a fluidized bed reactor). These requirements adds cost and complexity to the process. The aerogel, on the other hand, has extremely think pore walls, perhaps on the order of a few tens of angstroms. UV light may penetrate through hundreds of these pore walls activating a large surface area without the necessity of thick layers or constant agitation. Possessing very low crystallinity, the aerogel has only a small fraction of photoactive sites. Those sites that are activated by UV radiation, however, necessarily lie very close to the solid-gas interface; thus, absorbed UV photons lead much more efficiently to contaminant oxidation. Probably all of the UV light is absorbed by the anatase powder catalyst (even in a 1/32 inch thick layers), but only a relatively small fraction of the absorbed photons lead to oxidation. With thicker pore walls, the electron holes created by UV absorption have a much longer diffusion path to the sold-gas surface, and are much more likely to recombine with electrons in the bulk solid before reaching the surface. Moreover, even in the 1/32 inch thick layer, much of the anatase powder is probably not utilized at all because complete absorption of the UW light is accomplished very close to the surface of the bed. The characteristic of the aerogel enabling the efficient use of thicker beds makes the technology much more likely for commercialization for relatively small scale applications such as indoor air decontamination.

Another characteristic of the aerogel which should be noted is its high adsorption capacity. As was already noted, this capacity suggests that sudden high concentrations ('spikes') of a strongly adsorbing contaminant such as acetone are quickly removed from the gas stream, to be more slowly oxidized on the surface.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A method of removing contaminants from a contaminated air stream, comprising the steps of:

providing a photocatalytic reactor cell having an inlet, an outlet, a cavity extending between the inlet and the outlet, a transparent side which permits light to be emitted into the cavity, and a catalyst bed formed of a titanium dioxide aerogel provided in the cavity such that a high fraction of the titanium dioxide aerogel is accessible to UV light and gas;

exposing the catalyst to the UV light; and introducing the contaminated air stream into the photocatalytic reactor cell such that the air stream passes through the catalyst bed causing oxidation of the contaminants of the air stream.

* * * * *